(12) United States Patent
Salah et al.

(10) Patent No.: US 12,076,204 B2
(45) Date of Patent: Sep. 3, 2024

(54) METHOD FOR GENERATING A MODEL OF A DENTAL ARCH

(71) Applicant: DENTAL MONITORING, Paris (FR)

(72) Inventors: Philippe Salah, Paris (FR); Laurent Debraux, Paris (FR); Thomas Pellissard, Paris (FR)

(73) Assignee: DENTAL MONITORING, Paris (FR)

( * ) Notice: Subject to any disclaimer, the term of this patent is extended or adjusted under 35 U.S.C. 154(b) by 0 days.

(21) Appl. No.: 17/612,815

(22) PCT Filed: May 20, 2020

(86) PCT No.: PCT/EP2020/064182
§ 371 (c)(1),
(2) Date: Nov. 19, 2021

(87) PCT Pub. No.: WO2020/234411
PCT Pub. Date: Nov. 26, 2020

(65) Prior Publication Data
US 2022/0222910 A1    Jul. 14, 2022

(30) Foreign Application Priority Data
May 22, 2019  (FR) ..................................... 1905357

(51) Int. Cl.
*A61C 7/00*        (2006.01)
*A61C 9/00*        (2006.01)
(Continued)

(52) U.S. Cl.
CPC ............ *A61C 7/002* (2013.01); *A61C 9/0053* (2013.01); *A61C 13/34* (2013.01); *G06T 19/20* (2013.01);
(Continued)

(58) Field of Classification Search
CPC ....... G06T 2210/41; G06T 2207/30036; G06T 2219/2004; G06T 2219/2021; G06T 19/20;
(Continued)

(56) References Cited

U.S. PATENT DOCUMENTS 5,975,893 A     11/1999  Chishti et al.
2018/0168780 A1*  6/2018  Kopelman ............. A61B 34/20
(Continued)

FOREIGN PATENT DOCUMENTS

EP          3412245 A1     12/2018
EP          3432218 A1      1/2019
(Continued)

OTHER PUBLICATIONS

International Search Report corresponding to International Application No. PCT/EP2020/064182 dated Jul. 20, 2020, 6 pages.
(Continued)

*Primary Examiner* — Wesner Sajous
(74) *Attorney, Agent, or Firm* — Ronald M. Kachmarik; Cooper Legal Group LLC

(57) ABSTRACT

A method for generating a 3D digital, updated, model of a dental arch, including:
  Acquiring at least one updated image. Each updated image representing an active aligner attached, in an operating position, to a dental arch, or 'image with aligner', or representing the dental arch without an aligner, or 'image of uncovered teeth'.
  Searching in an updated image, referred to as the 'updated analysis image', for representations of teeth that are non-compliant with the treatment scenario.
  If one or more non-compliant teeth are identified, determining, depending on the updated time, one of an intermediate models, or 'active intermediate model',
(Continued)

then identifying one or more models of teeth representing the noncompliant tooth or teeth, respectively, in the active intermediate model.

Deforming the active intermediate model until an updated model is obtained that is compatible with at least one of the updated images.

15 Claims, 7 Drawing Sheets

(51) Int. Cl.
    *A61C 13/34*     (2006.01)
    *G06T 19/20*     (2011.01)
    *G06V 10/10*     (2022.01)
    *G06V 10/44*     (2022.01)
    *G06V 10/82*     (2022.01)
    *G06V 20/64*     (2022.01)

(52) U.S. Cl.
CPC .............. *G06V 10/17* (2022.01); *G06V 10/44* (2022.01); *G06V 10/454* (2022.01); *G06V 10/82* (2022.01); *G06V 20/64* (2022.01); *G06T 2210/41* (2013.01); *G06T 2219/2004* (2013.01); *G06T 2219/2021* (2013.01)

(58) Field of Classification Search
CPC ... G06T 17/00; G06T 7/0014; G06F 18/2413; G06F 18/22; G06V 10/454; G06V 10/44; G06V 10/17; G06V 10/82; G06V 20/64; G06V 2201/03; A61C 9/0053; A61C 7/002; A61C 7/08; A61C 13/34

USPC ........................................................ 345/419
See application file for complete search history.

(56) References Cited

U.S. PATENT DOCUMENTS

| | | | |
|---|---|---|---|
| 2018/0168781 A1* | 6/2018 | Kopelman | A61B 90/36 |
| 2019/0080029 A1* | 3/2019 | Kuo | A61C 7/08 |
| 2020/0237486 A1* | 7/2020 | Kopelman | G16H 30/40 |
| 2021/0121271 A1* | 4/2021 | Kopelman | A61B 90/36 |

FOREIGN PATENT DOCUMENTS

| | | |
|---|---|---|
| EP | 3432219 A2 | 1/2019 |
| EP | 3432312 A1 | 1/2019 |
| WO | 2006065955 A2 | 6/2006 |
| WO | 2008149221 A1 | 12/2008 |
| WO | 2008149222 A2 | 12/2008 |
| WO | 2016066651 A1 | 5/2016 |
| WO | 2016066654 A1 | 5/2016 |

OTHER PUBLICATIONS https://en.wikipedia.org/wiki/Clear_aligners#cite_note-invisalignsystem-10.

Zhu, Jun-Yan, et al., "Unpaired image-to-image translation using cycle-consistent adversarial networks", Proceedings of the IEEE International Conference on Computer Vision (ICCV), 2017, pp. 2223-2232.

* cited by examiner

[Fig 1]
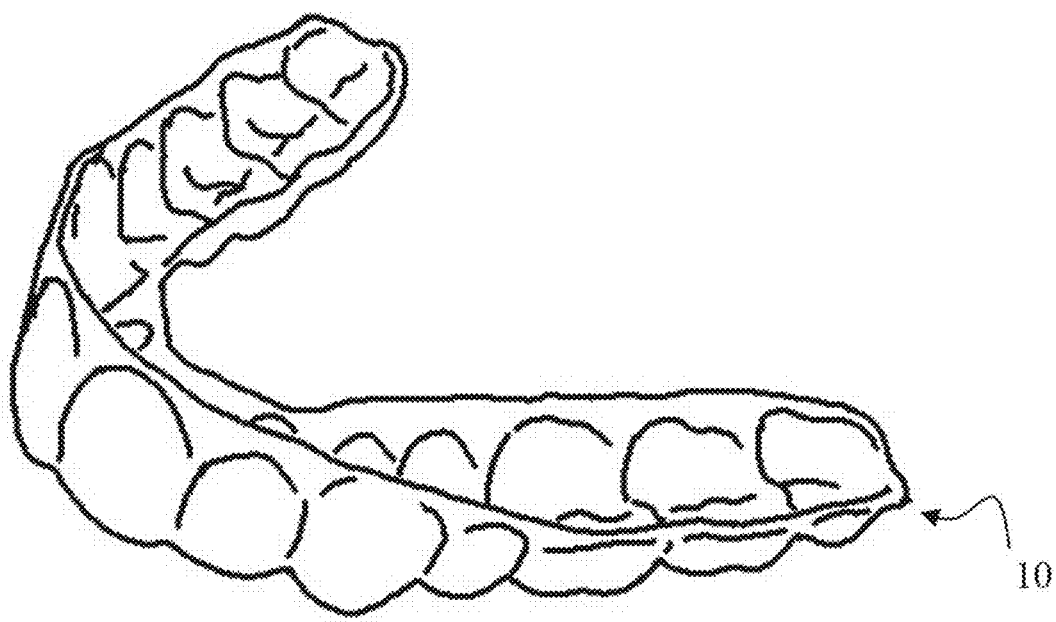
[Fig 2]
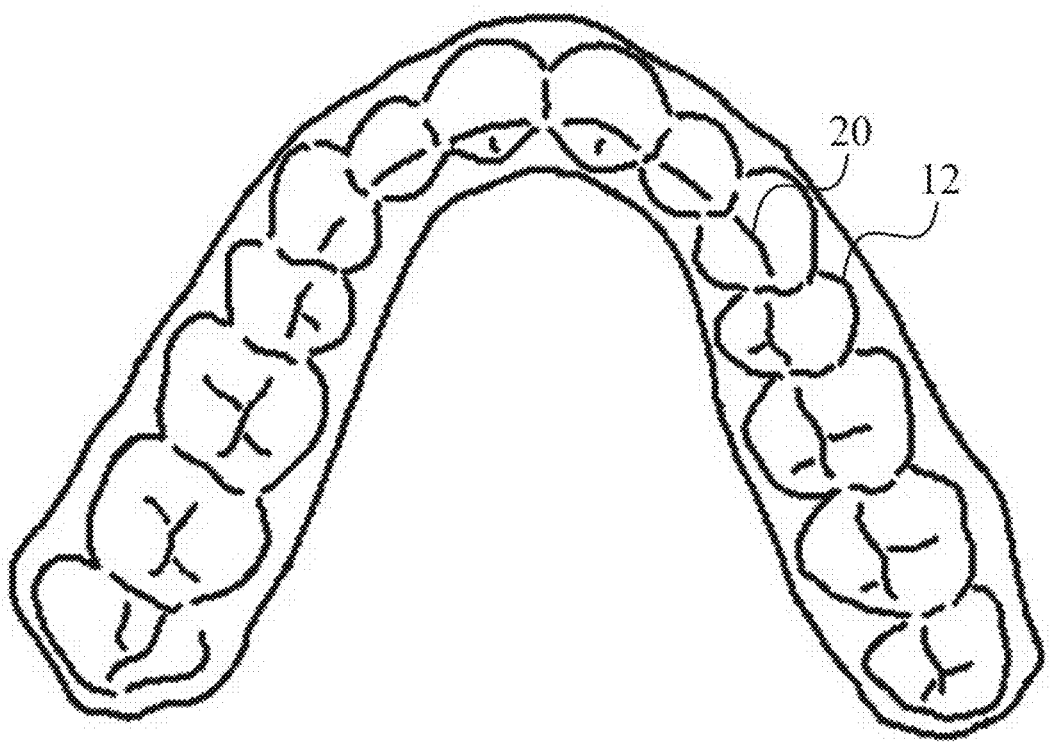

[Fig 3]
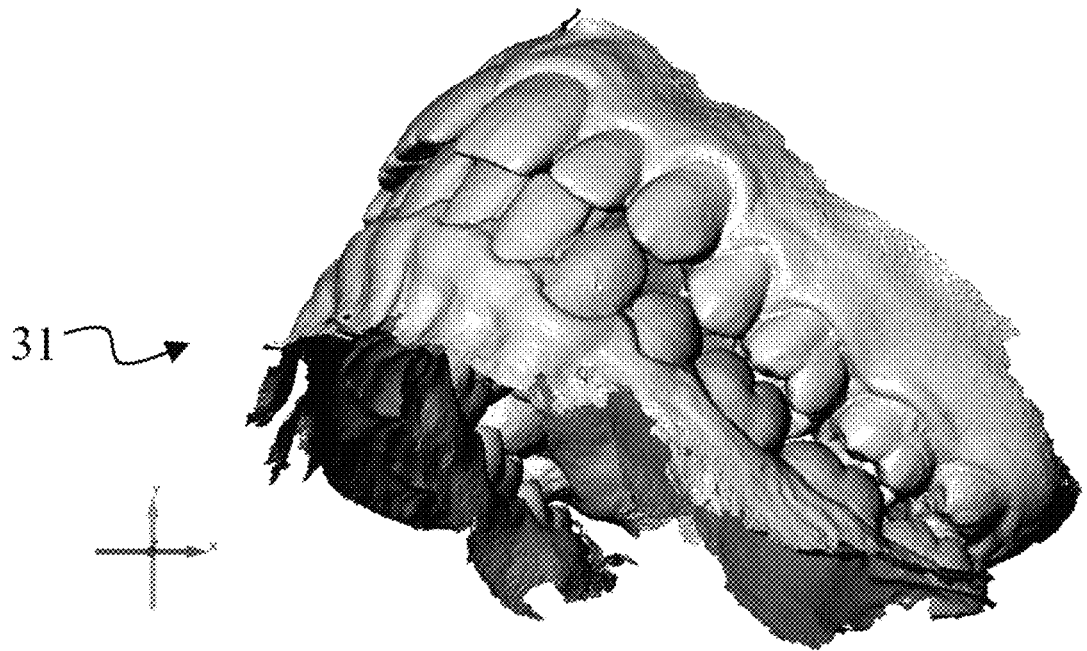
[Fig 4]
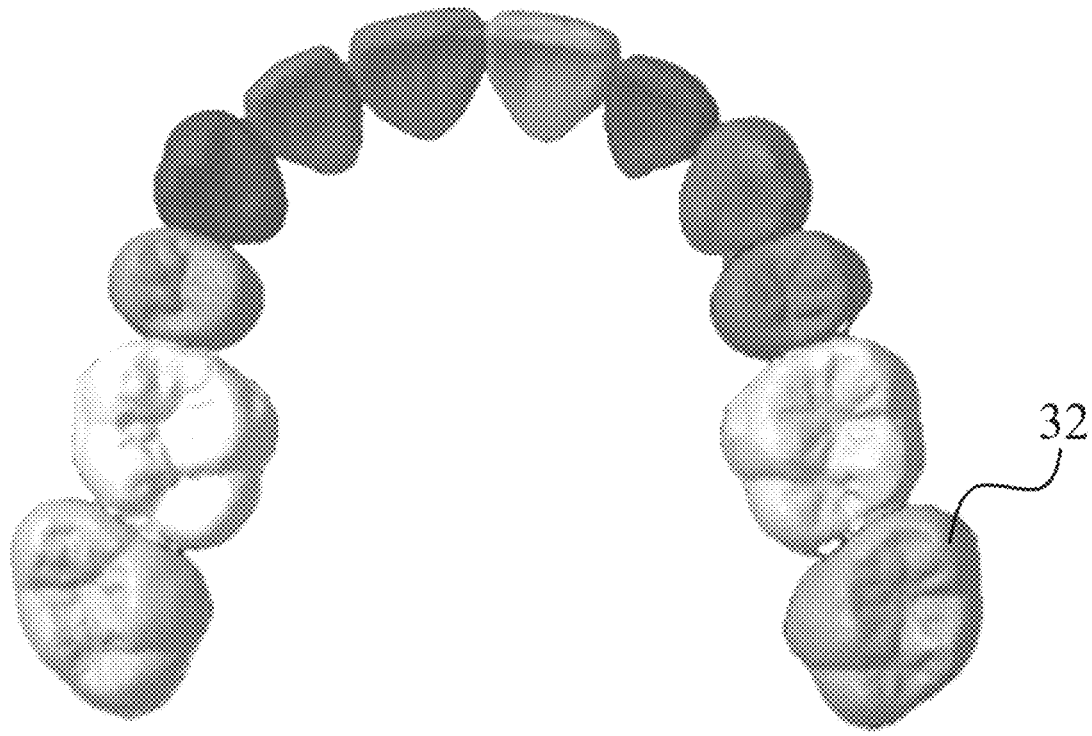

[Fig 5]
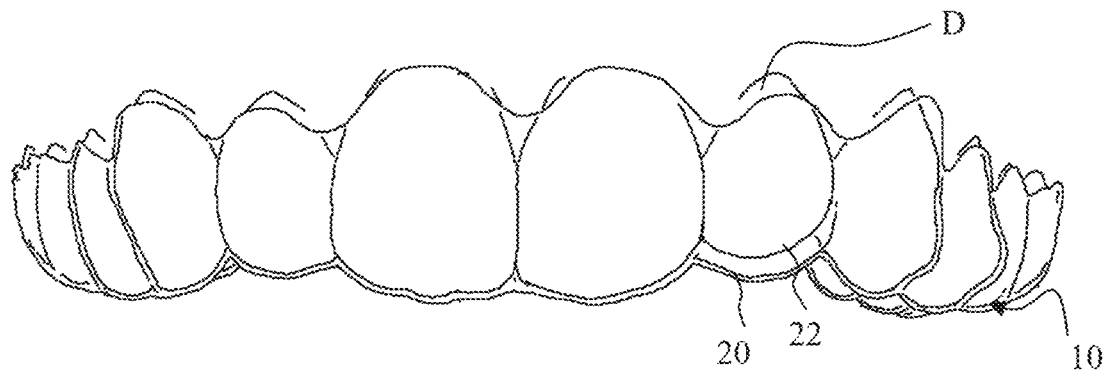
[Fig 6]
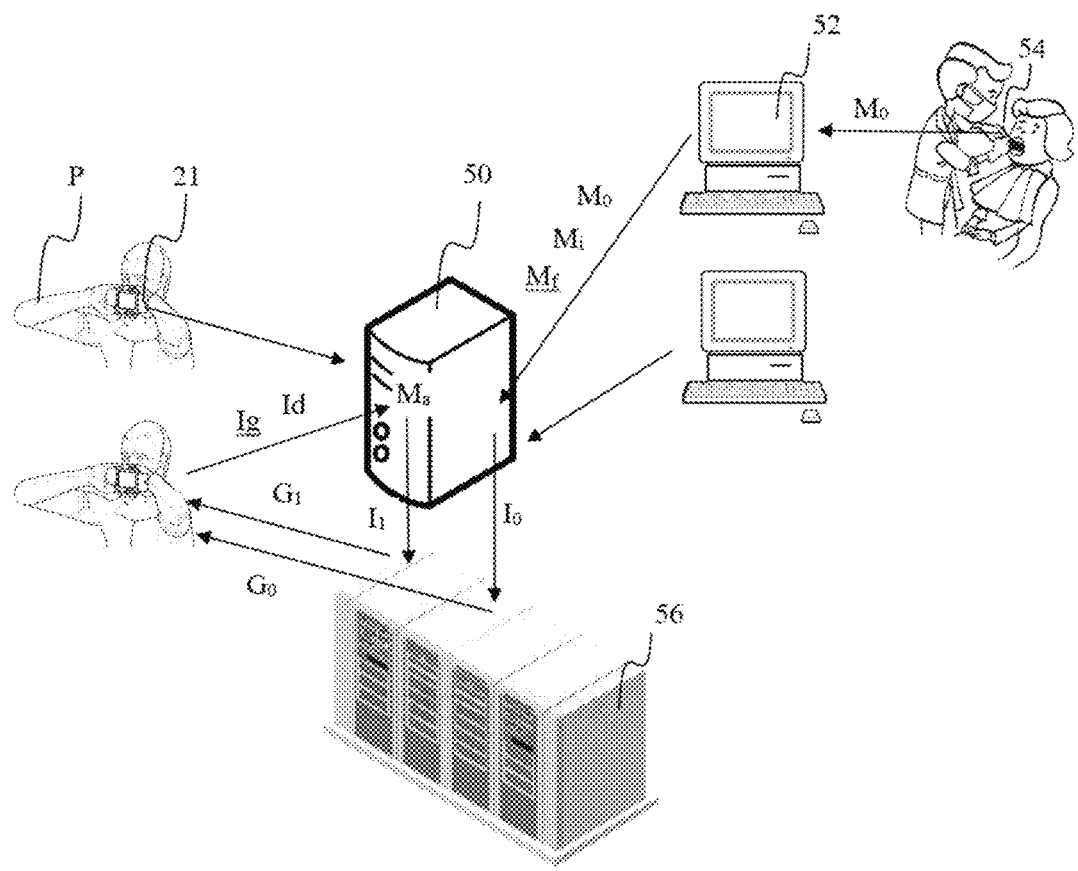

[Fig 7]
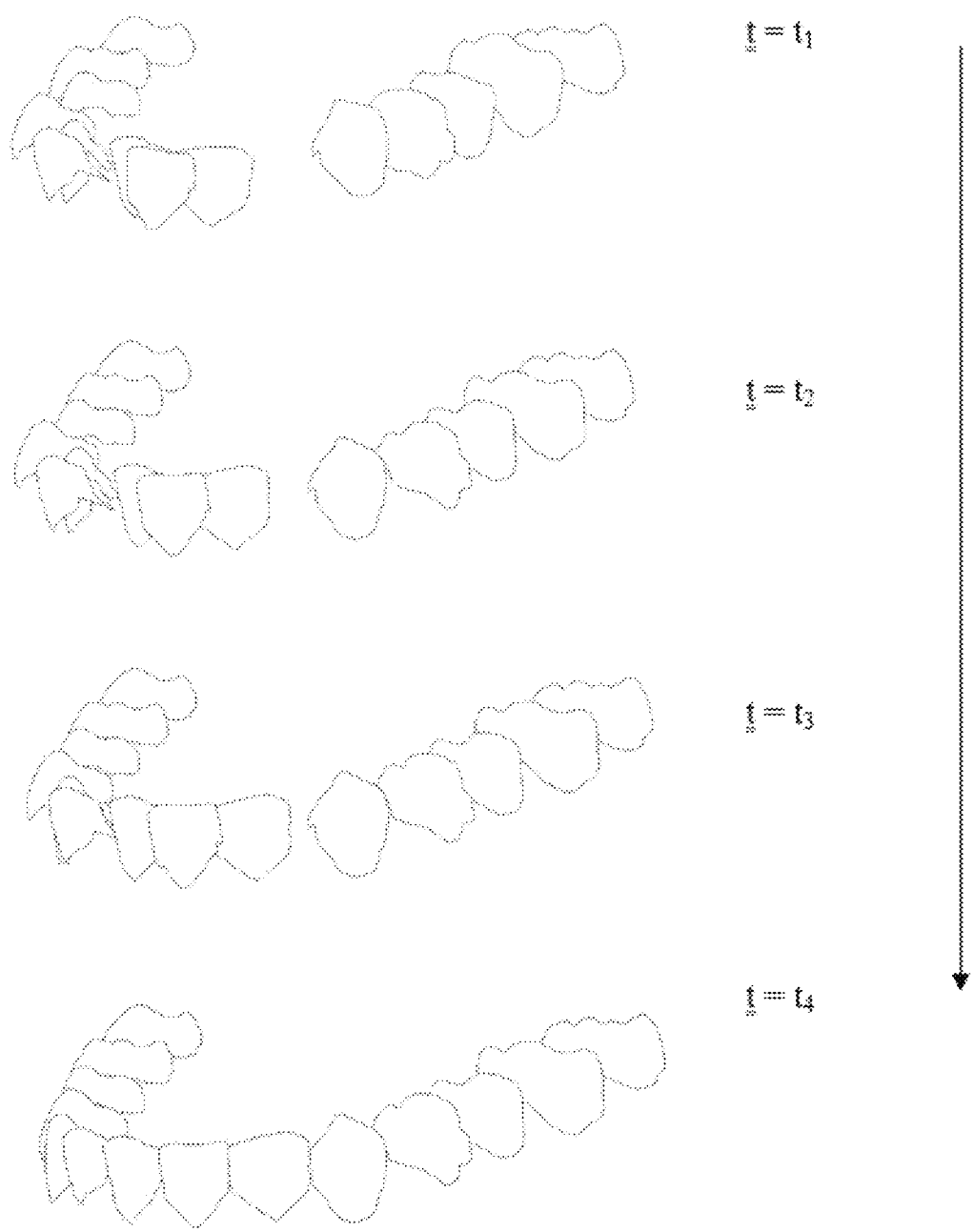

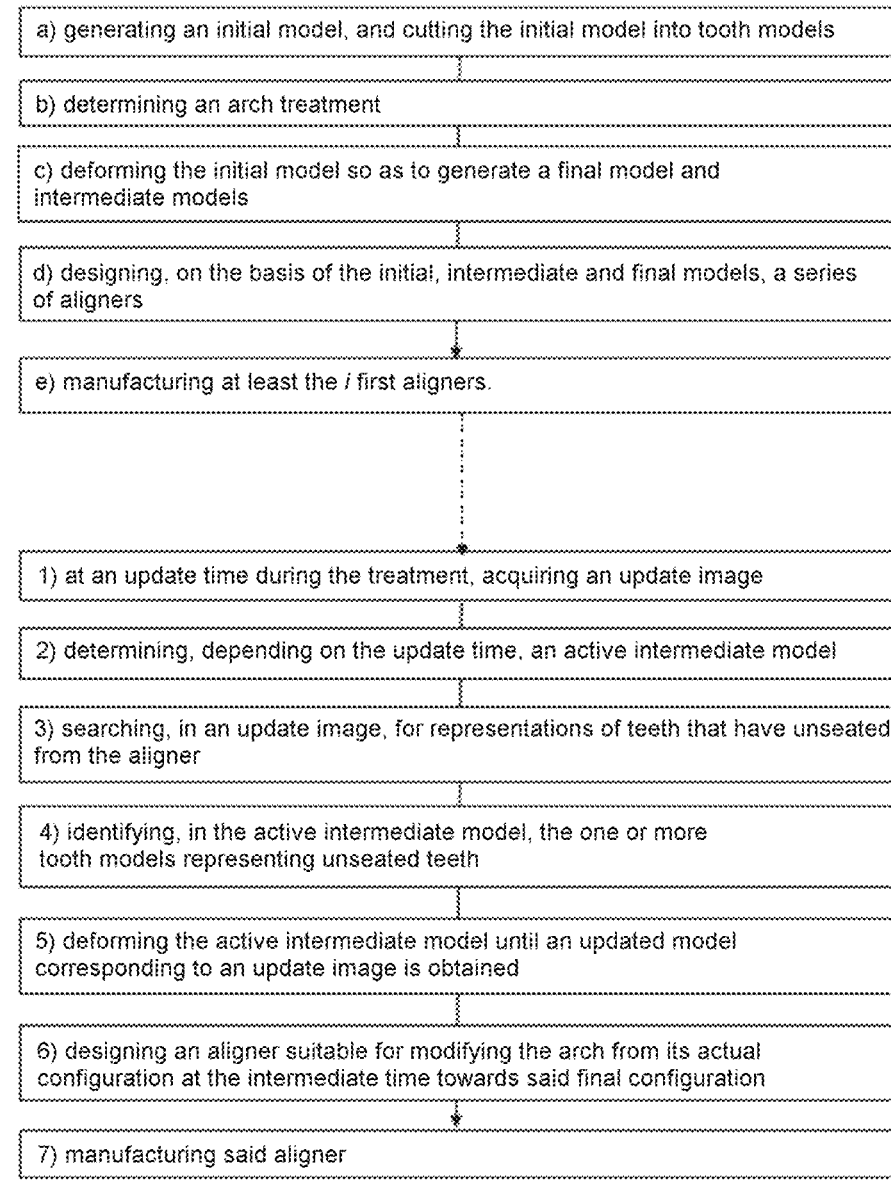

[Fig 9]
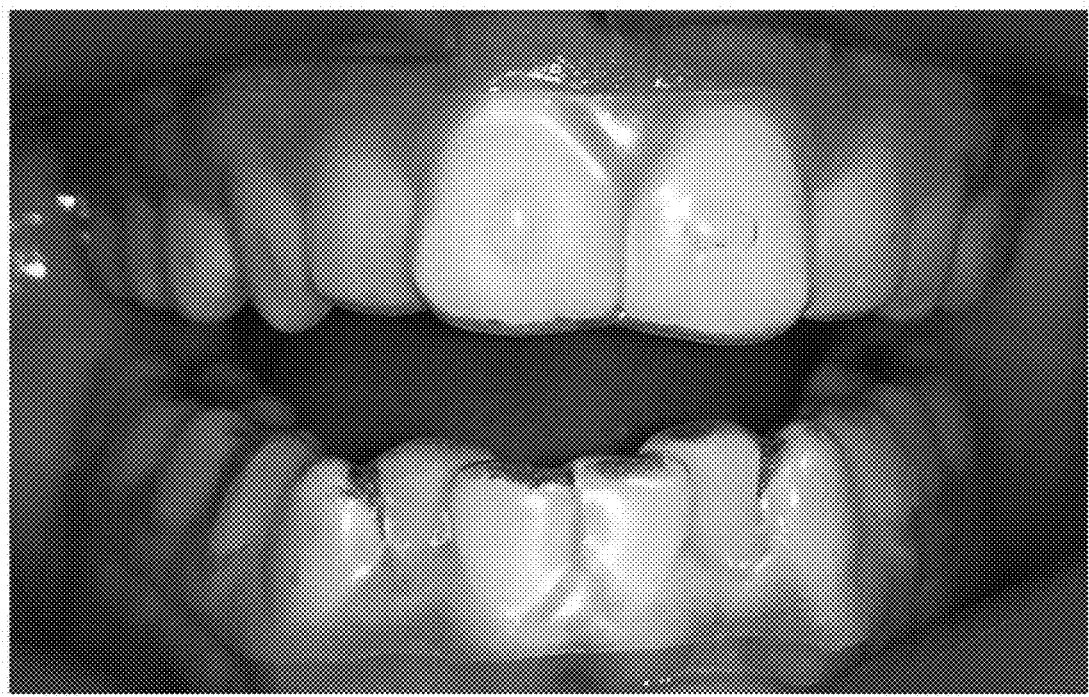
[Fig 10]
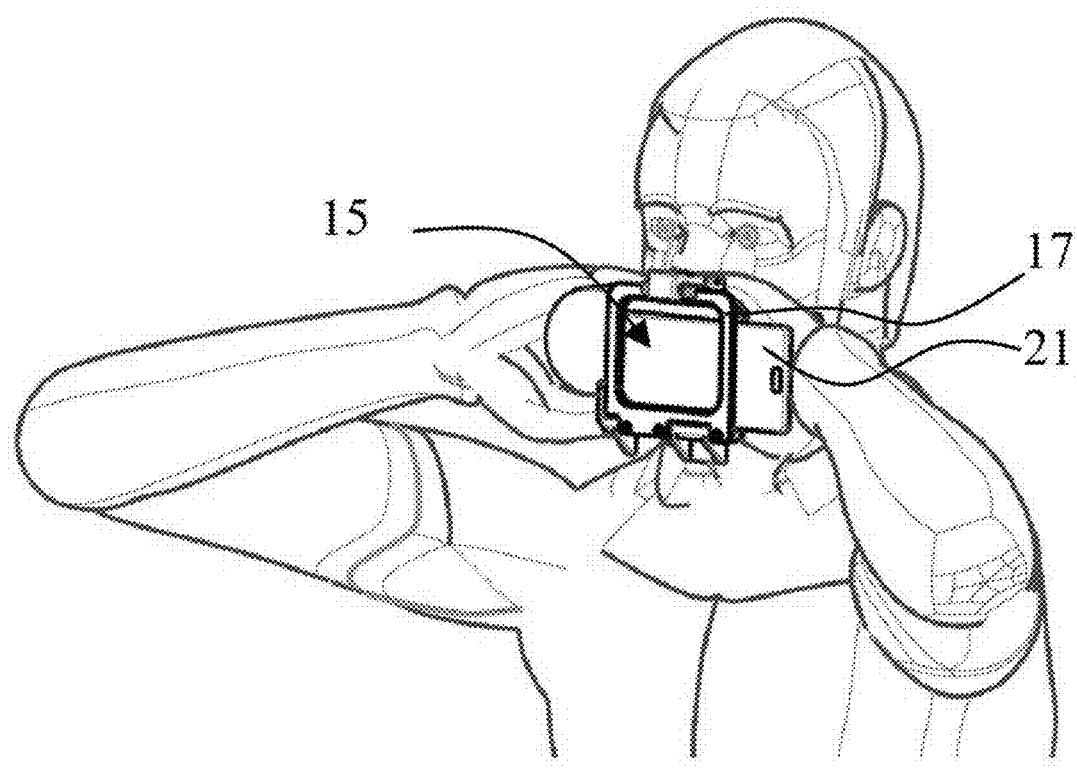

[Fig 11]
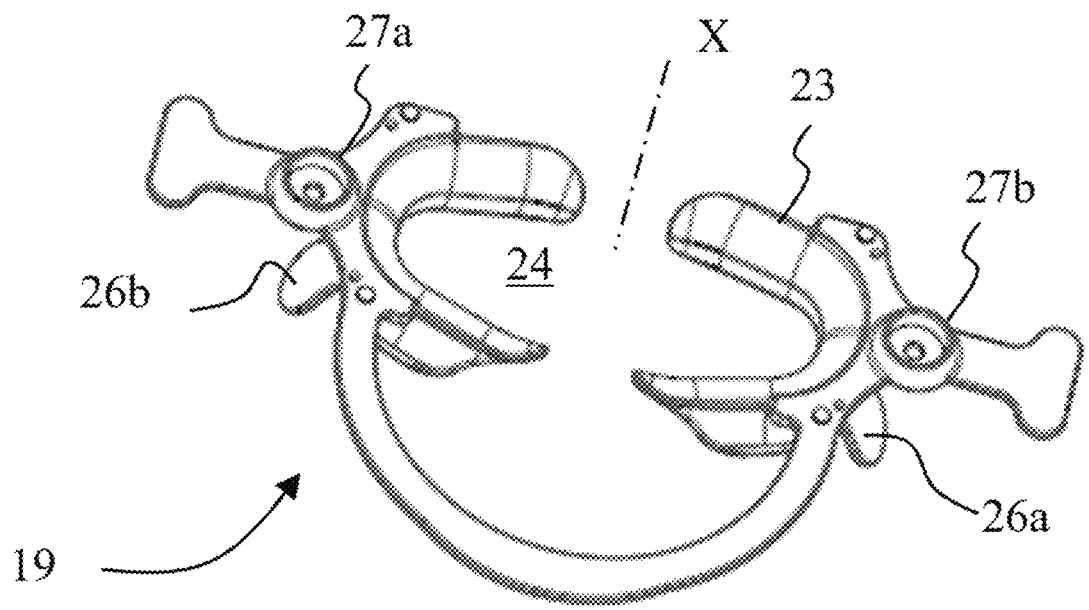
[Fig 12]
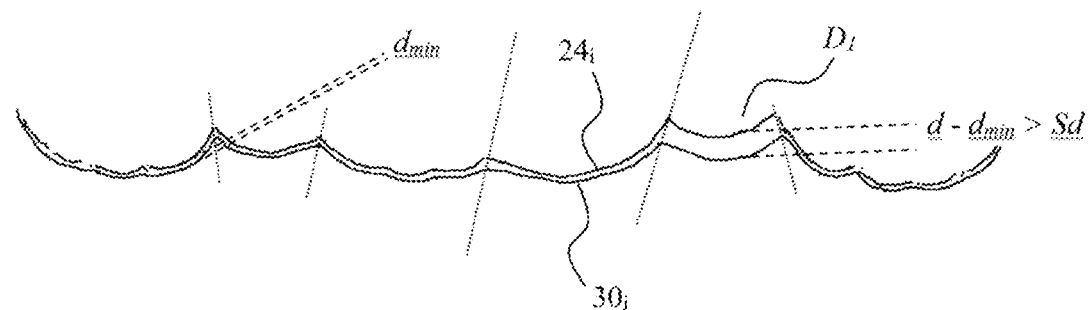
[Fig 13]
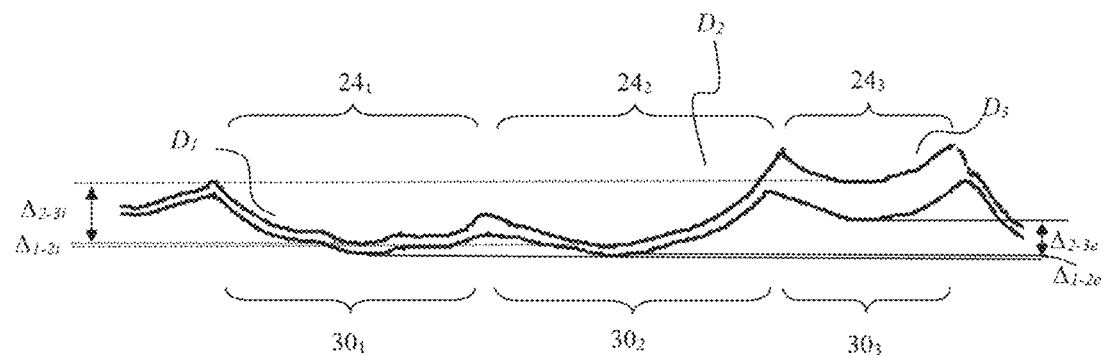

METHOD FOR GENERATING A MODEL OF A DENTAL ARCH

TECHNICAL FIELD

The present invention relates to a method for generating a three-dimensional digital model of a dental arch.

The invention also relates to a method for manufacturing orthodontic aligners by means of a generating method according to the invention, in particular with a view to adapting an orthodontic treatment by means of such aligners.

Lastly, the invention relates to a computer system for implementing these methods.

PRIOR ART

As shown in FIGS. 1 and 2, an orthodontic aligner 10 conventionally takes the form of a removable device of integral construction, conventionally made of a transparent polymer material, shaped to follow the successive teeth of the arch to which it is attached. It comprises a gutter 12, the general shape of which is U-like, shaped so that a plurality of teeth of an arch, and generally all of the teeth of an arch, may be accommodated therein.

The shape of the gutter is determined to ensure the attachment of the aligner to the teeth, but also depending on a desired target position of the teeth. More precisely, the shape is determined so that, when the aligner is in its service position, it exerts stresses that tend to move the treated teeth toward the target position.

Conventionally, at the start of the orthodontic treatment, the shapes that the various aligners must have at various times during the treatment are determined, then all of the corresponding aligners are manufactured. To this end, it is known to carry out the following steps:

generating, at an initial time $t_1$, typically at the start of the treatment, a three-dimensional digital model, called the "initial model", of a dental arch of the patient, said arch being in an initial configuration, and cutting the initial model into tooth models;

determining an orthodontic treatment suitable for modifying the arch from said initial configuration, via intermediate configurations at respective intermediate times $t_n$, n being comprised between 2 and N, to a final configuration, at a final time $t_{N+1}$;

deforming the initial model so as to generate intermediate and final models representing the dental arch in the intermediate and final configurations, respectively;

determining, on the basis of the initial, intermediate and final models, a series of N aligners, the first aligner being intended to be worn until the time $t_2$ and the $n^{th}$ aligner being intended to be worn from the time $t_n$ to the time $t_{n+1}$;

manufacturing at least some of the aligners.

All of the manufactured aligners are then provided to the patient so that, at the predetermined intermediate times, he may change aligner.

At regular intervals during the treatment, the patient goes to the orthodontist for a visual check-up, in particular to verify whether the movement of the teeth is as expected and whether the aligner that he is wearing is still suitable for the treatment.

In particular, the orthodontist may visually diagnose unseating of the aligner. Specifically, the bottom 20 of the gutter has a shape that is substantially complementary to the shape of the free ends 22 of the teeth (FIG. 5). Hence, the contour of the bottom of the gutter may be compared to the contour of the teeth D in order to evaluate a gap between the bottom of the gutter and one or more free ends of the teeth.

If unseating is detected, the orthodontist takes a new impression of the teeth, or, equivalently, a new scan of the teeth, then repeats the process described above in order to design and manufacture a new series of aligners.

The need to have to go to the orthodontist is an imposition on the patient. The patient's confidence in his orthodontist may also be decreased. Finally, it results in an additional cost. The number of check-ups by the orthodontist must therefore be limited.

Moreover, a poorly fitted aligner may also be unsightly.

To solve these problems, the Applicant has proposed, in EP 3 412 245, a method for evaluating the shape of an orthodontic aligner worn by a patient.

This method advantageously allows unseating of the aligner to be detected remotely. It considerably facilitates evaluation of the suitability of the aligner for the treatment. In particular, it may be implemented on the basis of simple images, and in particular on the basis of photographs or films, taken without particular precautions, by the patient for example. The number of appointments with the orthodontist may therefore be limited.

However, when a tooth not conforming with the treatment is detected, and in particular in the case of unseating between the aligner and a tooth, an appointment must be made with the orthodontist in order to have a new series of aligners produced. Apart from the inconvenience that this causes the patient, this appointment results in a delay in treatment. Specifically, the treatment must be interrupted between the time at which unseating is detected and receipt of the new aligners.

There is a need for a solution that addresses these problems.

One aim of the invention is to meet, at least partially, this need.

SUMMARY OF THE INVENTION

Review of the Invention

The invention provides a method for generating, of a dental arch of a patient, a three-dimensional digital model called the "updated model", in the course of a treatment of said dental arch with an orthodontic aligner, called the "active aligner", in particular in the context of a treatment with a series of orthodontic aligners intended to be attached in succession to said arch, said treatment having been simulated by means of a treatment scenario generated at an initial time $t_1$, at the start of the treatment for example, the treatment scenario comprising a plurality of intermediate models, each intermediate model being a three-dimensional digital model of the dental arch, said intermediate model being cut into tooth models and being determined to represent the dental arch at one respective intermediate time after the initial time.

A generating method according to the invention comprises the following steps:

1) at an update time during the treatment, acquiring at least one update image, each update image being an aligner image representing the active aligner attached, in service position, to the dental arch, or an image of bare teeth representing the dental arch without aligner;

2) before step 4), and preferably before step 3), determining, depending on the update time, a said intermediate model, or "active intermediate model";

3) searching, in an update image, called the "analysis update image", for one or more representations of teeth not conforming with the treatment scenario;

if one or more not conforming teeth are detected, 4) identifying one or more tooth models respectively representing the one or more not conforming teeth in the active intermediate model;

5) deforming the active intermediate model until an updated model that is compatible with at least one of said update images, called the "deformation update image", is obtained.

The invention is based on the fact that an intermediate model of a treatment scenario designed before the start of the treatment correctly models the dental arch, at the corresponding intermediate time, if the not conforming teeth are ignored. In particular, if the aligner has not unseated from a tooth, it is a sign that the treatment is going as planned for that tooth. At an intermediate time close to the update time, the corresponding intermediate model therefore conforms with reality for the "conforming" teeth, which are in general almost all the teeth. It is thus possible to use this active intermediate model, conventionally initially generated for the manufacture of aligners, as a starting point to create an updated model.

In particular, it is possible to immediately exploit all of the portion of the active intermediate model relating to the conforming teeth. The updated model may therefore be constructed on the basis of the active intermediate model, the actual position only of tooth models of the not conforming teeth solely being sought.

Advantageously, the patient therefore no longer needs to perform a new scan to adapt the aligners to a negative progression of his treatment. The treatment scenario and one or preferably more than one update image suffice. The treatment is considerably simplified and accelerated thereby.

Furthermore, the determination of the updated model is simplified not only because the number of tooth models to be moved is very limited—typically 1 to 5 tooth models represent not conforming teeth, but also because these movements are constrained by the tooth models of the conforming teeth.

The method may comprise, before step 1), generating the treatment scenario comprising said plurality of intermediate models. The treatment scenario is generated after the treatment itself has been determined. The treatment scenario may also be generated at the same time as the treatment itself is determined.

A method according to the invention may also comprise one or more of the following optional features:

at least some, or even all of the intermediate models of the treatment scenario represent the dental arch in expected configurations at intermediate times marking aligner changes;

in step 1), a reminder is sent to the patient, preferably on his mobile phone, so that he takes at least one update image, preferably at least one aligner image and preferably at least one image of bare teeth;

in step 1), more than two update images are acquired, and preferably more than 4 update images;

in step 1), at least two update images are acquired under different acquisition conditions, and in particular with different orientations of the acquiring device, the angle of the optical axis of the acquiring device to the patient's frontal plane preferably varying by more than 20°, more than 30°, more than 45°, more than 60°, or even more than 90°, between the acquisitions of the at least two update images;

in step 1), at least one, and preferably each update image is a photo or an image extracted from a film;

in step 1), at least one, and preferably each update image is an extraoral image;

in step 1), at least one, and preferably each update image is acquired with a mobile phone, preferably by the patient himself, and optionally after a dental retractor has been fitted;

in one embodiment, in step 1), at least one, and preferably each update image is acquired with a mobile phone, preferably by the patient himself, after the mobile phone and a dental retractor have been attached to a holder, then the dental retractor placed in the patient's mouth;

the holder takes the form of a casing opening exclusively onto the retractor and onto the mobile phone;

all the update images are acquired in a time interval of a duration less than 5 days, preferably less than 1 day, preferably less than 1 hour, and preferably less than 10 minutes;

the patient sends the one or more update images to a computer, preferably by means of the mobile phone that acquired the aligner image;

the computer is configured to receive and process update images of a plurality of patients, and preferably more than 100, more than 1000, or more than 10 000 patients;

before step 2), an intermediate model of the dental arch is generated from intermediate models of the treatment scenario, then added to the treatment scenario by way of intermediate model;

in step 2), the active intermediate model is determined manually by an operator, preferably by a dental professional, and more preferably an orthodontist, preferably using a computer allowing him to view the treatment scenario, or is performed automatically, by a computer, preferably said computer having received and processed update images of a plurality of patients, preferably by comparing the update time with the intermediate times of the intermediate models of the treatment scenario;

in step 2), the active intermediate model is an intermediate model the intermediate time of which differs from the update time by less than 4 weeks, less than 2 weeks, and preferably less than 1 week;

in step 2), the active intermediate model is the intermediate model the intermediate time of which is closest to the update time;

in step 3), the search for representations of not conforming teeth in the analysis update image is carried out manually by an operator, preferably by a dental professional, and more preferably an orthodontist, preferably using a computer allowing him to view the one or more update images, or, preferably, is performed automatically, by a computer, preferably said computer having received and processed update images of a plurality of patients, which computer preferably implements a deep-learning device, and preferably a neural network;

in step 3), the representation of a tooth in the analysis update image is considered to not conform with the treatment scenario if, when the analysis update image is superposed in register on a view of the active intermediate model that is compatible with said analysis update image, the analysis update image being at the same scale as the view of the active intermediate model and at real-scale (the dimensions of the actual tooth being identical to those of its representation), at least one point of said representation is separated from the corresponding point in said view by a distance greater than 1/10 mm, 3/10 mm, 5/10 mm or 1 mm, and preferably less than 7 mm or 5 mm;

in step 4), tooth models of the not conforming teeth in the active intermediate model are identified manually by an operator, preferably by a dental professional, and more preferably an orthodontist, preferably using a computer allowing him to view the active intermediate model, or is performed automatically, by a computer, preferably said computer having received and processed update images of a plurality of patients, which computer preferably implements a deep-learning device, and preferably a neural network;

in step 3), to detect a not conforming tooth, the analysis update image is analyzed without recourse to the active intermediate model, in which case the active intermediate model may be determined after step 3);

alternatively, in step 3), to detect a not conforming tooth, the analysis update image is compared with a view of the active intermediate model, in which case the active intermediate model must be determined before step 3);

in step 3), to detect a not conforming tooth, a position, orientation and calibration of a virtual acquiring device that allow said virtual acquiring device to have a view on the active intermediate model that is as close as possible to the analysis update image, i.e. a view of the active intermediate model that has a maximum degree of compatibility (i.e. is the best fit) with said analysis update image, are sought; then said view and said analysis update image are compared, or an updated map representing discriminating information of said analysis update image is compared with a reference map representing said discriminating information in said view;

in step 3), to detect a not conforming tooth, the analysis update image being an aligner image, a contour of at least one tooth and a contour of the aligner are determined in the analysis update image, then said contours are compared;

a tooth is considered to be not conforming if, in the aligner image, it is unseated, beyond a threshold, from the aligner;

before step 5), the active intermediate model is processed in order to improve its precision;

in step 5), the deformation of the active intermediate model comprises movements of tooth models of said active intermediate model, and preferably consists of such movements;

in step 5), the movement of the tooth models is continued until the positioning error for each tooth model, with regard to the deformation update image, is less than 1 mm, preferably less than 5/10 mm, preferably less than 3/10 mm, preferably less than 2/10 mm, and preferably less than 1/10 mm;

in step 5), the tooth models of the not conforming teeth are moved manually by an operator, preferably by a dental professional, and more preferably an orthodontist, preferably using a computer allowing him to view the active intermediate model, or are moved automatically, by a computer, preferably said computer having received and processed update images of a plurality of patients, which computer preferably implements a deep-learning device, and preferably a neural network, or an optimizing method, and preferably a metaheuristic optimizing method;

in step 5), the movement of the tooth models of the not conforming teeth is limited by the tooth models of the conforming teeth, which models remain stationary;

in step 5), the movement of the tooth models of the not conforming teeth is an iterative process whereby, in each iteration,
 one or more of said tooth models of the not conforming teeth are moved so as to obtain an arch model to be tested, then
 the model to be tested is tested by evaluating a degree of compatibility between said model and the deformation update image, in particular an image of bare teeth;
the updated model being, among all the tested models, the one which provides the highest degree of compatibility;

before said iterative process, a position, orientation and calibration of a virtual acquiring device allowing the active intermediate model to be observed such as to generate a view in which the representation of the conforming teeth is superposable in register with the representation of said conforming teeth in the deformation update image, or "constrained virtual acquisition conditions", are sought, then, during said iterative process, in each iteration, the degree of compatibility between the model under test and the deformation update image is evaluated by comparing the deformation update image and a view of the model under test obtained under said constrained virtual acquisition conditions;

the cycle of the iterations is interrupted if the number of iterations exceeds a predetermined number or if the value of the degree of compatibility exceeds a predetermined threshold;

in step 5), during said deformation of the active intermediate model, the only tooth models moved are tooth models of not conforming teeth;

in step 3) or 4), preferably at the end of step 4), the non-conformity of the one or more not conforming teeth, and in particular the movement of the one or more unseated teeth, is measured, on the basis of at least one update image, and preferably by comparing said analysis update image with the active intermediate model, then in step 5), the one or more tooth models of the not conforming teeth are moved depending on said measurement, preferably until the positioning error for each tooth model, with regard to the deformation update image, is less than 1 mm, preferably less than 5/10 mm, preferably less than 3/10 mm, preferably less than 2/10 mm, and preferably less than 1/10 mm;

in step 5), the deformation of the active intermediate model comprises a movement of the one or more tooth models of the not conforming teeth, the amplitude and/or the direction of said movement being determined depending on a measurement of the non-conformity of said one or more not conforming teeth, said measurement being carried out on the basis of at least one update image, in particular the aligner image, preferably by comparison of said update image with the active intermediate model.

The invention also relates to a method for manufacturing an orthodontic aligner, said method comprising steps 1) to 5), then the following steps 6) designing, on the basis of the updated model and of a final model representing the arch in a theoretical final configuration, an "updated" aligner suitable for, in the service position, modifying the dental arch from an actual configuration at the update time toward said theoretical final configuration;

7) manufacturing the updated aligner and providing the updated aligner to the patient.

The theoretical final configuration, planned for the arch at a final time after the last intermediate time, is typically that of the arch targeted at the end of treatment.

A method according to the invention may be partially implemented by computer, in particular as regards the steps of modifying a model, and of computing or exploring a model, in particular to search for constrained virtual acquisition conditions, or to analyze images or maps, for example to look for contours.

The invention also relates to:
- a computer program, comprising program-code instructions for executing one or more, and preferably all of steps 2), 3), 4), 5), and even step 6), when said program is executed by a computer,
- a computer-readable storage medium on which such a program is stored, for example a memory or a CD-ROM, and
- a computer into which such a program is loaded.

The invention also relates to a system comprising:
- a personal device, preferably a mobile phone, configured to acquire the one or more update images in step 1),
- a computer loaded with a program comprising program-code instructions for executing one or more, and preferably all of steps 2) to 5), and preferably step 6), when said program is executed by a computer, i.e. "configured to" execute these steps;
- optionally, a computer loaded with a program configured to manufacture the aligners in step 7).

Definitions

By "patient" or "user", what is meant is any person for whom a method according to the invention is implemented, whether this person is sick or not.

By "teeth", what is meant is a set of teeth of a dental arch.

By "dental professional", what is meant is any person qualified to provide dental care, this including in particular an orthodontist and a dentist.

The aligner used by the patient at a time during the treatment is called the "active aligner". In a treatment with a plurality of aligners, it is expected that each aligner will be successively active.

A 3D scanner, or "scanner", is a device allowing a model of a dental arch to be obtained.

The "service position" is the position of the aligner when it has been attached to the arch in order to treat this arch. Conventionally, the attachment is deactivatable by the patient, via simple traction on the aligner.

When an aligner is attached to an arch in the service position, teeth that do not sit correctly in the aligner and teeth that sit correctly in the aligner are called "unseated teeth" and "non-unseated teeth", respectively. An orthodontist is perfectly able to distinguish between unseated teeth and non-unseated teeth. This distinction may also be made by a computer, in particular by evaluating the distance between a tooth and the bottom of the gutter of the aligner that is attached thereto.

More generally, a tooth is said to be "conforming" or "not conforming" when, at an update time, it is or is not, respectively, in the position planned for in the treatment scenario. An unseated tooth is one example of a not conforming tooth.

An "update time" is a time at which update images are acquired. The length of this time is short enough that the configuration of the teeth does not change appreciably during it.

A configuration of an arch is said to be an "actual" configuration when it is the configuration that the patient's arch in fact has. A configuration of an arch is said to be a "theoretical" configuration when it is a "simulated" configuration of the patient's arch or a configuration "planned" for a future time.

By "model", what is meant is a three-dimensional digital model. A model consists of a set of voxels. A "model of an arch" is a model representing at least part of a dental arch, and preferably at least 2, preferably at least 3, and preferably at least 4 teeth. FIG. 3 shows an example of a view of an arch model.

A "tooth model" is a three-dimensional digital model of a tooth of the arch of a patient. A model of an arch may be cut so as to define tooth models for at least some of the teeth and preferably all the teeth represented in the arch model. Tooth models are therefore models within the model of the arch. FIG. 4 shows an example of a view of a cut arch model. Computational tools for manipulating the tooth models of an arch model exist. These tools allow constraints to be set, in particular in order to limit the movements of the tooth models to realistic movements, for example in order to prevent adjacent tooth models from interpenetrating.

A "scenario" is a sequence of models of an arch which represent successive arch configurations. In particular, a "treatment scenario", or "treatment plan", comprises models that represent configurations of an arch at various times during its treatment. These times are conventionally the initial time, before the start of the treatment, intermediate times during the treatment, and the final time, at the end of the treatment. Each model of a scenario representing the arch in its expected configuration at an intermediate time is called an "intermediate model". FIG. 7 illustrates an example of a treatment scenario.

The configurations of the arch at the intermediate and final times are theoretical because they result from a simulation for a future time. They are therefore anticipated, or "planned", and may therefore differ from reality at the intermediate time. Displaying the models of a scenario, chronologically, allows the effect of the treatment of the arch to be simulated.

An example of a software package for manipulating tooth models and creating a treatment scenario is the program Treat, which is described on the page https://en.wikipedia.org/wiki/Clear_aligners#cite_note-invisalignsystem-10. U.S. Pat. No. 5,975,893A also describes the creation of a treatment scenario.

By "image" what is meant is a two-dimensional image, such as a photograph or an image extracted from a film. An image is formed from pixels.

The "acquisition conditions" specify the spatial position, spatial orientation and calibration (for example the values of diaphragm aperture and/or of exposure time and/or of focal length and/or of sensitivity)
- of an actual device for acquiring images relating to a dental arch of the patient (actual acquisition conditions) or
- of a virtual device for acquiring images relating to a model of a dental arch of the patient (virtual acquisition conditions).

The "calibration" of an acquiring device consists of all the values of the calibration parameters. A calibration parameter is a parameter intrinsic to the acquiring device (unlike its position and its orientation) and the value of which influences the acquired image. For example, diaphragm aperture is a calibration parameter that modifies depth of field. Exposure time is a calibration parameter that modifies the brightness (or "exposure") of the image. Focal length is a calibration parameter that modifies viewing angle, i.e. the amount of "zoom". "Sensitivity" is a calibration parameter that modifies the reaction of the sensor of a digital acquiring device to incident light.

Preferably, the calibration parameters are selected from the group formed by diaphragm aperture, exposure time, focal length and sensitivity.

An observation of a model, under determined conditions of virtual acquisition (in particular with a calibration of a virtual acquiring device), at a determined angle and at a determined distance, is called a "view".

By "image of an arch", "view of an arch", "representation of an arch", "scan of an arch", or "model of an arch", what is meant is an image, a view, a representation, a scan or a model of all or part of said dental arch.

A model of a dental arch of a patient is "compatible" with an image when there is a view of this model that corresponds to said image, i.e. a view such that the representations of the teeth in the view are positioned, relatively to one another, just like the representations of the teeth in the image. The contours of the tooth models represented in the view are therefore substantially superposable in register with the contours of the representations of said teeth in the image.

This view of the model may also be qualified "compatible", or "superposable in register", with said image.

Deep-learning algorithms are deep-learning devices that are well known to those skilled in the art. They comprise "neural networks" or "artificial neural networks".

A person skilled in the art will be able to select a neural network, depending on the task to be performed. In particular, a neural network may in particular be selected from:

the networks called convolutional neural networks (CNNs), which specialize in image classification, for example
AlexNet (2012)
ZF Net (2013)
VGG Net (2014)
GoogleNet (2015)
Microsoft ResNet (2015)
Caffe: BAIR Reference CaffeNet, BAIR AlexNet
Torch: VGG_CNN_S, VGG_CNN_M, VGG_CNN_M_2048, VGG_CNN_M_1024, VGG_CNN_M_128, VGG_CNN_F, VGG ILSVRC-2014 16-layer, VGG ILSVRC-2014 19-layer, Network-in-Network (Imagenet & CIFAR-10)
Google: Inception (V3, V4)
networks specializing in location and detection of objects in an image (object detection networks), for example:
R-CNN (2013)
SSD (single shot multibox detector: object detection network), Faster R-CNN (faster region-based convolutional network method: object detection network)
Faster R-CNN (2015)
SSD (2015)
RCF (Richer Convolutional Features for Edge Detection) (2017)
networks specializing in image generation, for example:
Cycle-Consistent Adversarial Networks (2017)
Augmented CycleGAN (2018)
Deep Photo Style Transfer (2017)
FastPhotoStyle (2018)
pix2pix (2017)
Style-Based Generator Architecture for GANs (2018)
SRGAN (2018).

The above list is non-limiting.

Training of a neural network consists in confronting it with a training database containing information on the two types of object that the neural network must learn to make "correspond", i.e. to connect to each other.

Training may be done on the basis of a training database made up of records each comprising a first object of a first type and a corresponding second object of a second type.

Alternatively, training may be done on the basis of a training database made up of records each comprising either a first object of a first type, or a second object of a second type, each record however comprising information relating to the type of object it contains. Such training techniques are for example described in the article by Zhu, Jun-Yan, et al. "*Unpaired image-to-image translation using cycle-consistent adversarial networks.*"

Training the neural network with these records teaches it to deliver, from any object of the first type, a corresponding object of the second type.

The quality of the analysis carried out by the neural network depends directly on the number of records in the training database. Preferably, the training database contains more than 10 000 records.

To evaluate the "positioning error" of a tooth model, the distance (when the deformation update image, at 1:1 scale, is superposed in register on a view, of the active intermediate model, that is compatible with said deformation update image, at a scale of 1:1) between each point of the representation, in the deformation update image, of the tooth modeled by the tooth model and the corresponding point in said view is measured. The positioning error is the greatest of these distances considering all the points of said representation having a corresponding point in said view. At 1:1 scale means that the representation of the teeth is at real-scale, the deformation update image and the view of the active intermediate model then representing the tooth with its actual dimensions.

"Comprise", "include" or "have" must be interpreted in a broad, non-limiting manner, unless otherwise indicated.

BRIEF DESCRIPTION OF THE FIGURES

Other features and advantages of the invention will become more clearly apparent on reading the detailed description that follows and on examining the appended drawing, in which:

FIG. 1 shows a perspective view of an orthodontic aligner;

FIG. 2 shows a view from above of the orthodontic aligner of FIG. 1;

FIG. 3 shows an example of an initial model (an intermediate model, a final model and an updated model may take a similar form);

FIG. 4 shows an example of a model from which the tooth models have been cut (only the tooth models have been shown);

FIG. 5 schematically shows a holding arch bearing an orthodontic aligner;

FIG. 6 shows a system suitable for implementing a method according to the invention;

FIG. 7 shows a treatment scenario;

FIG. 8 schematically illustrates the methods according to the invention;

FIG. 9 shows an example of an aligner image;

FIG. 10 schematically illustrates the acquisition of an aligner image and/or an image of bare teeth;

FIG. 11 schematically illustrates a retractor that may be used with the acquiring kit shown in FIG. 10;

FIG. 12 schematically illustrates a first method for detecting unseating in an image;

FIG. 13 schematically illustrates a second method for detecting unseating in an image.

DETAILED DESCRIPTION

In one embodiment, a method according to the invention comprises, before the implementation of steps 1) to 5), the following steps (FIG. 8):
- at an initial time $t_1$, typically at the start of the treatment,
- a) generating a three-dimensional digital model, called the "initial model", of a dental arch of a patient, said arch being in an actual initial configuration, and cutting the initial model into tooth models;
- b) determining an arch treatment for modifying the arch from said initial configuration, via theoretical intermediate configurations at respective intermediate times $t_n$, n being comprised between 2 and N, to a theoretical final configuration, at a final time, typically at the end of the treatment;
- c) deforming the initial model so as to generate a treatment scenario comprising a final model and intermediate models representing the dental arch in the final configuration and in intermediate configurations, respectively;
- d) designing, on the basis of the initial, intermediate and final models, a series of aligners;
- e) manufacturing one or more of the aligners and providing these aligners to the patient.

In one embodiment of the invention, the method further comprises, during the treatment, steps 1) to 5) of a method for generating an updated model according to the invention, then preferably the following steps:
- 6) designing, on the basis of the updated model and of the final model, an updated aligner shaped to modify the arch from its actual configuration at the update time toward said final configuration;
- 7) manufacturing the updated aligner and providing the updated aligner to the patient.

In step a), the initial model is produced at an initial time $t_1$ that precedes the start of an orthodontic treatment by means of orthodontic aligners, and that is preferably less than 6 months, preferably less than 3 months or less than one month or less than 2 weeks before the start of the treatment.

The initial model may be prepared on the basis of measurements made on the patient's teeth or on a physical model of his teeth, a plaster model for example.

The initial model is preferably created by means of a professional apparatus, for example by means of a 3D scanner, which is preferably implemented by a dental professional, for example by an orthodontist, or an orthodontic laboratory. In an orthodontic practice, the patient or the physical model of his teeth may be advantageously placed in a precise position and the professional apparatus may be state-of-the-art. As a result a very precise initial model may be obtained. The initial model preferably provides information on the position of the teeth with an error of less than 5/10 mm, preferably of less than 3/10 mm, and preferably of less than 1/10 mm.

The initial model is for example of point-cloud type or of one of the following types: STL, OBJ, 3D DXF, IGES, STEP, VDA. Advantageously, such a so-called "3D" model may be observed from any angle.

The initial model is conventionally observable and manipulable by means of a computer. The initial model is then cut to define tooth models.

Cutting a three-dimensional model into tooth models is a conventional operation in which the model is cut in order to define the representation of one or more of the teeth in the initial model. Other elements of the arch, the gums for example, may also be modeled.

The initial model may be cut manually by an operator, using a computer, or be cut automatically, by a computer, which preferably implements a deep-learning device, and preferably a neural network.

In particular, tooth models may be defined as described, for example, in international patent application PCT/EP2015/074896.

FIG. 4 shows one example of an initial model from which the tooth models 32 have been cut (only the tooth models have been shown; they have been shaded differently in order to be more easily identifiable).

After cutting, the tooth models may be moved. With a computer, the initial cut model may thus be deformed, via movement of the tooth models, without modifying the tooth models, to simulate a movement of the teeth from the initial time to a final time at which the teeth are in a final configuration, the final time possibly in particular marking the end of the treatment.

In step b), the treatment through which one or more teeth will be moved, from the initial configuration to the final configuration, via intermediate configurations, is determined.

The set of arch models allowing the stages of the treatment to be visualized forms the treatment scenario. A computer is used to display the treatment scenario and to store the initial model deformed to simulate the configuration of the arch at the various intermediate times.

Conventionally, there are a plurality of possible potential scenarios for a given treatment. In one embodiment, a computer determines the potential scenarios and selects the treatment scenario from among them. In another embodiment, a computer determines the potential scenarios, presents them to a dental professional, and the dental professional selects the treatment scenario from among them. In another, preferred embodiment, a dental professional, preferably an orthodontist, determines the potential scenarios, and selects the treatment scenario from among them. A computer advantageously allows him to view a simulation of the effect, on the arch, of a potential scenario.

In step c), the initial model is deformed to generate a final model representing the arch in the theoretical final configuration and the intermediate models marking the stages between the initial model and the final model.

The deformation may be determined, depending on an orthodontic treatment, by a dental professional, preferably an orthodontist, preferably using a computer allowing him to view the effect on the arch of the envisaged treatments, or be determined automatically, by a computer, which preferably implements a deep-learning device, and preferably a neural network.

Preferably, steps b) and c) are simultaneous. Specifically, the treatment scenario is determined as a result of one or more simulations carried out by deforming the initial model to the configuration of the final model, by moving the tooth models. When the treatment has been selected, it is enough, in order to generate the intermediate models, to simulate this treatment and, at intermediate times, to save the deformed initial model.

FIG. 9 shows an example of a treatment scenario comprising an initial model, two intermediate models and a final model.

In step d), a series of aligners are designed to deform the arch, via movement of the teeth, according to the treatment scenario.

In step e), one or more of the first aligners of the series are manufactured. Conventionally, all the aligners of the series are manufactured. These aligners are provided to the patient so that he may begin his treatment.

Methods comprising steps a) to e) are well-known and commonly used to design and manufacture series of orthodontic aligners.

Conventionally, the patient is monitored by his orthodontist. As explained in the introduction, the orthodontist regularly checks the fit of the aligners and, in case of non-conformity with the treatment, and in particular in case of unseating, generates a new arch model with a scanner, then repeats steps b) to e) with the initial model replaced by this new model, so as to produce a new series of aligners intended for the rest of the treatment.

According to the invention, the method comprises, during the treatment, steps 1) to 5), and preferably 1) to 7).

In step 1), at an update time, an update image, called the "analysis" update image, which allows a non-conformity, and in particular unseating of a tooth with respect to the aligner worn at the update time, to be detected, is acquired.

The update time may for example be more than 2, more than 4, more than 8 or more than 12 weeks after the initial time.

Preferably, before the update time, for example less than 2 weeks before the update time, at least one reminder informing the patient of the need to take an analysis update image is sent to the patient. This reminder may take paper form or, preferably, electronic form, and for example the form of an email, of an automatic alert from a specialized mobile application or of an SMS. Such a reminder may be sent by the practice or the orthodontic laboratory or by the dentist or by a specialized application on the patient's mobile phone, for example.

The analysis update image is taken with an image-acquiring device, preferably a personal acquiring device, preferably a mobile phone, a so-called "connected" camera, a so-called "smart" watch, a tablet or a (desktop or laptop) personal computer comprising an image-acquiring system such as a webcam or a camera.

The analysis update image is preferably extraoral.

In one embodiment, a photo-taking kit 15 is used, as illustrated in FIGS. 10 and 11. Preferably, such a kit comprises a holder 17, a dental retractor 19, and an image-acquiring device, preferably a mobile phone 21. The dental retractor 19 and the acquiring device, preferably a mobile phone, are preferably attached in a removable manner to the holder 17.

The retractor 19 may have the characteristics of conventional retractors.

As shown in FIG. 11 (in which it has been separated from the holder), it preferably comprises a gutter 23 that extends about a retractor opening of axis X and that is arranged so that the patient's lips may rest therein while letting the patient's teeth be seen through said retractor opening.

The retractor 14 may be attached to the holder by one or more clips 27a and 27b, magnetic clips for example.

Preferably, the retractor comprises lugs 26a and 26b for moving the cheeks out of the way, so that the acquiring device, attached to the holder, may acquire, through the retractor opening, photos of the vestibular surfaces of teeth placed at the back of the mouth, such as molars.

Preferably, the holder takes the form of a casing opening exclusively onto the opening of the retractor and onto the mobile phone. The mobile phone thus observes the patient's dental arch through the casing. Advantageously, the holder allows the position of the mobile phone with respect to the arch to be preset.

The acquisition is preferably carried out by the patient or a friend or relative of the patient, but may be carried out by any other person, and in particular by a dentist or an orthodontist, preferably without requiring the image-acquiring device to be precisely placed with respect to the teeth.

Preferably, the analysis update image is a photograph or is an image extracted from a film. It is preferably a color image, and preferably a true-color image. More preferably, the analysis update image is a photograph showing an actual dental arch as it would be perceived by the human eye (unlike a tomographic image or a panoramic image acquired by X-ray).

Preferably, the analysis update image is then sent to a centralized computer, preferably by means of the mobile phone that acquired the analysis update image.

Preferably, a specialized application is loaded into the mobile phone to guide, preferably orally and/or visually, the patient through the various operations to be carried out and to transmit the analysis update image.

In one embodiment, the analysis update image is an aligner image, this advantageously allowing non-conformities, and in particular unseating, to be detected by analyzing this image alone. This detection may also result from a comparison of this image with the active intermediate model.

In one embodiment, the analysis update image is an image of bare teeth, this advantageously allowing non-conformities to be detected with a good precision, and in particular without hindrance by the representation of the aligner, though a comparison of this image with the active intermediate model is then required.

Preferably, in step 1), an aligner image and an image of bare teeth are acquired, so as to benefit from two complementary analyses.

Preferably, in step 1), at least one image of bare teeth is acquired, to serve as a deformation update image in step 5).

In step 2), a said intermediate model, or "active intermediate model", is determined, preferably by computer, depending on the update time. Step 2) may be subsequent to step 3) if, in step 3), to detect a not conforming tooth, the analysis update image is analyzed without recourse to the active intermediate model.

From the treatment scenario, preferably by computer, the intermediate model that, according to this scenario, should best represent the dental arch at the update time is selected. On the assumption that the treatment is progressing in accordance with the treatment scenario, the intermediate model the intermediate time of which is closest to the update time may be selected. This intermediate model is said to be "active".

Preferably, the active intermediate model is an intermediate model the intermediate time of which is close to the update time, and preferably differs from the update time by less than 4 weeks, less than 2 weeks, and preferably less than 1 week. Preferably, the intermediate time of the active intermediate model is prior to the update time.

In one preferred embodiment, the active intermediate model is not modified before step 5). The movements of the teeth are therefore evaluated by comparing the analysis update image and an intermediate model designed at the initial time.

In one preferred embodiment, the active intermediate model may be corrected in a coarse manner, for example manually, in order to take into account modifications of the dental arch of the patient, between the initial time and the update time, that do not result from a drift in the course of the treatment, for example in order to remove a tooth model of a tooth that has fallen out or that has been extracted.

In step 3), representations, in the analysis update image, of teeth not conforming with the treatment scenario, and in particular representations of teeth that have unseated from the aligner, are sought.

Preferably, the centralized computer is programmed to automatically detect not conforming teeth and to identify those teeth.

Detection of a Non-Conformity with the Active Intermediate Model

The computer may in particular use an analysis update image taking the form of an image of bare teeth, and compare it to the active intermediate model.

Preferably, a position, orientation and calibration of a virtual acquiring device (which position, orientation and calibration are collectively called the "virtual acquisition conditions"), that correspond best ("best fit") to the actual acquisition conditions of the analysis update image, are sought.

The view under said virtual acquisition conditions is then compared with the analysis update image.

Comparison of said view and of the analysis update image allows not conforming teeth, i.e. not only unseated teeth, but also non-unseated teeth the position of which does not correspond to the treatment scenario, to be detected.

Comparison of the view and of the analysis update image may result from the comparison of corresponding maps relating to discriminating information, for example representing the contours of the teeth. The comparison procedure described below for comparing a test map and an updated map may be used.

The search for said virtual acquisition conditions and said comparison may in particular be carried out according to the teaching of PCT/EP2015/074896.

In one preferred embodiment, the representation of a tooth in the analysis update image is considered to not conform with the treatment scenario if at least one point of this representation, at a scale of 1:1, is separated from the corresponding point (i.e. the point representing the same point of the tooth) in said view, at a scale of 1:1, by a distance greater than $1/10$ mm, $3/10$ mm or $5/10$ mm and preferably less than 7 mm, or 5 mm.

The distance may also be measured in pixels, this advantageously avoiding the need to establish a scale.

The non-conformity is therefore advantageously a non-conformity allowing a drift in the execution of the treatment to be detected. In particular, a distance that is too great is considered not to relate to a drift in the treatment, but rather to an anomaly, for example because the tooth was badly determined, for example because it is masked in the analysis update image.

Detection of Unseating in an Aligner Image, without Recourse to the Active Intermediate Model To detect unseating by computer, an analysis update image taking the form of an aligner image may be analyzed, in particular to determine the contour of the bottom of the gutter of the aligner and the contour of the free ends of the teeth.

Those skilled in the art know how to process an image or a view to isolate a contour. This processing comprises, for example, the application of well-known masks or filters supplied with image-processing software. Such processing operations allow, for example, regions of high contrast to be detected.

These processing operations in particular comprise one or more of the following known and preferred methods:
applying a Canny filter, in particular to search for edges using the Canny algorithm;
applying a Sobel filter, in particular to compute derivatives by means of the extended Sobel operator;
applying a Laplace filter, to compute the Laplacian of an image;
detecting blobs in an image ("Blobdetector");
applying a threshold, to apply a set threshold to each element of a vector,
resizing, using relationships between areas of pixels ("Resize(Area)"), or bicubic interpolations in the vicinity of the pixels;
eroding the image by means of a specific structuring element;
dilating the image by means of a specific structuring element;
retouching, in particular using regions in the vicinity of the restored area;
applying a bilateral filter,
applying a Gaussian blur;
applying an Otsu's method, to find the threshold that minimizes intra-class variance;
applying an A* filter, to find a path between points;
applying an adaptive threshold, to apply an adaptive threshold to a vector,
applying an equalization filter to a histogram of a gray-scale image in particular;
detecting blur ("BlurDetection"), to compute the entropy of an image using its Laplacian;
detecting contours ("FindContour") of a binary image;
color filling ("FloodFill"), in particular to fill a connected element with a determined color.

The following non-limiting methods, although they are not preferred, may also be implemented:
applying a "MeanShift" filter, so as to find an object in a projection of the image;
applying a "CLAHE" filter, CLAHE standing for "Contrast Limited Adaptive Histogram Equalization";
applying a "Kmeans" filter, to determine the center of clusters and of groups of samples around clusters;
applying a DFT filter, so as to perform a discrete, forward or inverse Fourier transformation of a vector,
computing moments;
applying a "HuMoments" filter to compute Hu moment invariants;
computing the integral of an image;
applying a Scharr filter, allowing a derivative of the image to be computed by implementing a Scharr operator;
searching for the convex hull of points ("ConvexHull");
searching for points of convexity of a contour ("ConvexityDefects");
comparing shapes ("MatchShapes");
checking if points are on a contour ("PointPolygonTest");
applying Harris corner detection ("CornerHarris");
searching for minimum eigenvalues of gradient matrices, to detect corners ("CornerMinEigenVal");

applying a Hough transform to find circles in a grayscale image ("HoughCircles");

"Active contour modeling" (tracing the contour of an object on the basis of a potentially "noisy" 2D image);

computing a force field ("gradient vector flow" or GVF) in one portion of the image;

applying a cascade classifier ("CascadeClassification").

The determination of the contours of the teeth may be optimized according to the teachings of PCT/EP2015/074900.

In one embodiment, the contour of the bottom of the gutter and the contour of the free ends of the teeth are divided so as to define segments of these contours for each tooth. The segments of the contour of the bottom of the gutter and the segments of the contour of the free ends of the teeth are called the "outer tooth contours" $24_i$ and the "inner tooth contours" $30_i$, respectively (FIGS. 12 and 14). The adjectives "inner" and "outer" are used here only for the sake of clarity. In FIG. 12, the dotted lines show the boundaries of the successive segments.

The comparison may then be carried out by any means, and in particular using the technique for comparing inner and outer tooth contours that is described in EP 3 412 245.

In particular, it is possible, for each of a plurality of teeth for which inner and outer tooth contours have been determined, to carry out the following steps:

i) determining a distance between the inner and outer tooth contours;

ii) determining a distance threshold, preferably on the basis of the distances determined in step i);

iii) for each of said teeth, determining a distance score, depending
    on the distance between the inner and outer tooth contours and
    on the distance threshold.

In step i), a distance d between the inner and outer tooth contours is determined for each of said teeth (FIG. 13).

The distance between the inner and outer tooth contours of a tooth may for example be the average distance or the maximum distance between the pixels of said contours corresponding to the same point of the tooth.

This distance is preferably measured in pixels, this advantageously avoiding the need to establish a scale.

In step ii), a distance threshold Sd is determined, preferably on the basis of the distances determined in step i).

Preferably, in step ii), the distance threshold Sd is substantially equal to the smallest of the distances determined in step i) ($d_{min}$). Conventionally, at least one of the treated teeth makes contact with the bottom of the gutter into which it is inserted. The distance between the inner and outer tooth contours of this tooth is then equal to a minimum distance $d_{min}$ corresponding to a normal situation. It may therefore be used as a standard to evaluate, in step iii), the distances between the inner and outer tooth contours of the other teeth.

In step iii), a score, called the "distance score" S(d,Sd), is determined for each of the teeth, depending
    on the distance d between the inner and outer tooth contours and
    on the distance threshold Sd.

Preferably, the distance score for a tooth is equal to (d-Sd), i.e. to the difference between the distance between the inner and outer tooth contours of this tooth and the distance threshold. The higher the distance score, the more the affected tooth has unseated from the gutter.

FIG. 12 illustrates one example of implementation of steps i) to iii), in which example a tooth D1 has become unseated from the bottom of the aligner to the point that $d-d_{min}>Sd$.

It is also possible, for each of a plurality of teeth for which inner and outer tooth contours have been determined, to carry out the following steps:

i') for each pair consisting of a left tooth adjacent to a right tooth of at least a triplet of first, second and third adjacent teeth, for each of which inner and outer tooth contours have been determined, the first and third teeth being adjacent to the second tooth, determining an offset, called the "inner offset", between the inner tooth contour of said left tooth and the inner tooth contour of said right tooth, and determining an offset, called the "outer offset", between the outer tooth contour of said left tooth and the outer tooth contour of said right tooth, then
    determining the difference between the inner offset and the outer offset, which difference is called the "offset difference";

ii') determining an offset-difference threshold, preferably on the basis of the offset differences determined in step i');

iii') determining, for at least one, and preferably for each tooth of said triplet, at least one offset score, depending on the offset difference with an adjacent tooth and on the offset-difference threshold.

In step i'), at least one triplet consisting of first, second and third teeth, D1, D2 and D3, respectively, is considered, the first and third teeth being adjacent to the second tooth, i.e. the first, second and third teeth following in succession along an arch.

The inner tooth contours $30_1$, $30_2$ and $30_3$ and the outer tooth contours $24_1$, $24_2$ and $24_3$ of the teeth D1, D2 and D3, respectively, are determined.

An inner or outer "offset", respectively, represents a distance between the inner or outer tooth contours, respectively, of two adjacent teeth.

The following are determined
    an offset between the inner tooth contour of said first tooth $30_1$ and the inner tooth contour of said second tooth $30_2$, which offset is called the "first inner offset", $\Delta_{1-2}i$;
    an offset between the inner tooth contour of said second tooth $30_2$ and the inner tooth contour of said third tooth $30_3$, which offset is called the "second inner offset", $\Delta_{2-3}i$;
    an offset between the outer tooth contour of said first tooth $24_1$ and the outer tooth contour of said second tooth $24_2$, which offset is called the "first outer offset", $\Delta_{1-2}e$;
    an offset between the outer tooth contour of said second tooth $24_2$ and the outer tooth contour of said third tooth $24_3$, which offset is called the "second outer offset", $\Delta_{2-3}e$.

The inner offset between the inner tooth contours of two adjacent teeth is preferably equal to the greatest distance between the inner tooth contours of these two teeth.

The outer offset between the outer tooth contours of two adjacent teeth is preferably equal to the greatest distance between the outer tooth contours of these two teeth.

The inner offsets and the outer offsets are preferably measured in pixels, this advantageously avoiding the need to establish a scale.

The following are then determined:
    the difference between the first inner offset $\Delta_{1-2}i$ and the first outer offset $\Delta_{1-2}e$, which difference is called the "first offset difference" $\Delta_{1-2}$ ($=\Delta_{1-2}i-\Delta_{1-2}e$)

the difference between the second inner offset $\Delta_{2-3}i$ and the second outer offset $\Delta_{2-3}e$, which difference is called the "second offset difference" $\Delta_{2-3}$ $(=\Delta_{2-3}i-\Delta_{2-3}e)$.

In the example of FIG. 12, $\Delta_{1-2}$ is much smaller than $\Delta_{2-3}$.

In step ii'), an offset-difference threshold $S\Delta$ is determined, preferably on the basis of the first and second offset differences $\Delta_{1-2}$ and $\Delta_{2-3}$ determined in step i').

Preferably, in step ii'), the offset threshold is substantially equal to the smallest of the differences in offsets determined in step i').

Conventionally, at least two adjacent treated teeth make contact with the bottom of the gutter into which they are inserted. The offset difference between these two treated teeth is then substantially zero. Since this zero offset difference corresponds to a normal situation, it may therefore be used as a standard to evaluate the offset differences between adjacent treated teeth.

In FIG. 13, the offset difference between the two teeth $D_1$ and $D_2$ is substantially zero.

In step iii'), for each pair of teeth of said triplet, at least one score, called the "offset score", is determined depending on the offset difference with a tooth adjacent to said tooth and on the offset-difference threshold.

In particular, the offset difference of the first tooth with the second tooth may be compared to the offset-difference threshold $S\Delta$, which for example is zero. The offset-difference threshold may in particular be subtracted from the offset difference of the first tooth with the second tooth to determine an offset score of the first and second teeth.

This offset score indicates, for example if it is positive, that one or each of the first and second teeth is liable to have become unseated from the bottom of the gutter.

In FIG. 13, the offset difference between the two teeth $D_2$ and $D_3$ is positive, this being an indication that the second or third tooth has become unseated.

In FIG. 13, the offset difference between the two teeth $D_1$ and $D_2$ being substantially zero, the positive offset difference between the two teeth $D_2$ and $D_3$ therefore indicates that the third tooth has become unseated.

Generally, when a first offset score for first and second teeth indicates unseating of one of these two teeth, a second offset score is determined for the second tooth and a third tooth adjacent to the second tooth. If the second offset score is less than the first offset score, it is probable that it is the first tooth that has become unseated from the bottom of the gutter. Otherwise, it is probably the second tooth that has become unseated.

Alternatively, identification of the not conforming teeth, and in particular of the unseated teeth, may be carried out by an operator, and preferably by a dental professional, and more preferably an orthodontist, via simple observation of the aligner image displayed on the screen of a computer.

Analysis by Means of a Deep-Learning Device

A deep-learning device, preferably a neural network, may be employed to identify the not conforming teeth in the analysis update image.

In particular, it is possible to proceed as described in EP 3 432 218.

Preferably, the following steps are carried out:
I. creating a training database comprising more than 1000, preferably more than 5000, preferably more than 10 000, preferably more than 30 000, preferably more than 50 000, and preferably more than 100 000 historical records each comprising a historical image and a historical description, each historical image comprising one or more zones each representing one tooth, or "historical tooth zones", the associated historical description specifying, for each of the historical tooth zones, a tooth-attribute value of at least one tooth attribute;
II. training at least one deep-learning device, preferably a neural network, by means of the training database;
III. submitting the analysis update image, preferably an aligner image, to said at least one deep-learning device so that it determines at least one probability relative to an attribute value of at least one tooth represented in a zone at least partially representing said tooth in the analysis update image, or the "tooth analysis zone", the attribute value relating to the conformity of said represented tooth;
IV. determining, depending on said probability, whether a tooth of said arch is present at a position represented by said tooth analysis zone, and the attribute value of said tooth.

The deep-learning device may in particular be a neural network specializing in the location and detection of objects in an image (i.e. an object detection network) and in particular be chosen from the aforementioned examples of such networks.

It not only allows the representations of teeth in the analysis update image to be identified, but also allows whether they are conforming or not to be determined.

In step I, the tooth attribute is an attribute the value of which is specific to each tooth.

For example, the tooth attribute "unseated" will have the value "conforming" or "not conforming" depending on whether the tooth in question appears normally or abnormally positioned with respect to the aligner, respectively.

In step II, it is possible to input, into the deep-learning device, historical records each comprising a historical image and a description describing, preferably for each tooth represented in the historical image, the contours of the tooth and any non-conformities. The deep-learning device thus gradually learns to recognize, in an image, patterns, and to associate them with tooth zones and with tooth-attribute values relative to non-conformities, and in particular relative to tooth unseating.

In step III, the deep-learning device recognizes said patterns in the analysis update image. In particular, it may determine a probability relative to:
the presence, at a location in said analysis image, of a zone (the "tooth analysis zone") representing, at least partially, a tooth,
the attribute value of the tooth represented in said tooth analysis zone.

For example, in an aligner image, it is capable of determining that there is a 99.5% chance that a shape in the analysis image represents a tooth and that there is a 99% chance that this tooth has unseated from the aligner.

Preferably, the deep-learning device analyzes the entire analysis update image and determines probabilities for all of the tooth analysis zones it has identified.

In step IV, it is determined, preferably by computer, preferably for each tooth represented in the analysis update image, depending on the probabilities determined in step III, whether a represented tooth must be considered conforming or not conforming. For example, it may be considered that if the probability that a tooth is not conforming is greater than a threshold, for example 98%, this tooth has unseated from the aligner.

Combination of an Analysis with an Aligner Image and with an Image of Bare Teeth Preferably, not conforming teeth are detected via comparison of an image of bare teeth with the active intermediate model, and via detection by analyzing an aligner image alone. The end result is improved thereby.

Specifically, if the analysis update image is an aligner image, certain instances of unseating may be difficult to detect by analyzing this image alone. Not conforming teeth may therefore be considered to be conforming, in light of analysis alone of an aligner image. With an image of bare teeth and the active intermediate model, it may be possible to detect non-conformities that are not detectable in the aligner image.

If no not conforming teeth are detected, treatment may continue without modification of the treatment scenario. The aligners designed in step d) are therefore always suitable for the treatment. Preferably, an informational message is sent to the patient to inform him that the treatment is progressing correctly. Preferably, an informational message is also sent to the orthodontist who is caring for the patient.

If one or more not conforming teeth are detected, the process continues with step 4).

In step 4), the tooth models of the active intermediate model that represent the teeth identified in step 3) as being not conforming teeth, and in particular unseated teeth, are identified.

This identification may be carried out by any computer having access to the active intermediate model and to the identifiers of the not conforming teeth, and in particular unseated teeth, determined in step 3). These identifiers may be transmitted to a computer having access to the active intermediate model or vice versa, or the active intermediate model may be transmitted to a computer having access to the identifiers.

Preferably, the active intermediate model is transmitted to a centralized computer which analyzed the analysis update image and detected the not conforming teeth, and in particular unseated teeth, in step 3), and this centralized computer performs step 4).

As a variant, step 4) may be carried out by an operator having access to the active intermediate model.

In step 5), the active intermediate model is deformed until a configuration compatible with an update image taken at the update time is found. Preferably, this update image, called the "deformation update image", is an image of bare teeth, i.e. an image of a bare arch, without aligner. Deformation of the active intermediate model is facilitated thereby.

The deformation update image may be identical to or different from the analysis update image. Preferably, it is acquired and transmitted as described above with respect to the analysis update image, preferably with a mobile phone, preferably with an acquiring kit comprising a holder to which are attached the mobile phone and a dental retractor. Preferably, the deformation update image is extraoral.

A deformation achieved by acting on all the tooth models of the active intermediate model takes a very long time to implement. Above all, the inventors have observed that it does not allow a model that correctly represents the actual configuration of the arch at the update time to be obtained. In particular, they have observed that extraoral update images do not always allow the precise position of the teeth at the back of the mouth (molars in particular) to be determined if all the tooth models are moveable during the deformation. Such a deformation may therefore lead to a substantial deviation from the active intermediate model in regions in which this model correctly represents the actual position of the teeth. Aligners manufactured on the basis of these deformed models may therefore be unusable.

In one embodiment of the invention, the active intermediate model is not deformed, except in the regions of tooth models of not conforming teeth, in particular of unseated teeth. The general shape of the active intermediate model is therefore retained and only these tooth models are moved.

The deformation of the active intermediate model is thus limited to movements of tooth models of the active intermediate model that represent not conforming teeth.

In particular, deforming the intermediate model by moving only the tooth models of not conforming teeth makes it possible to evaluate very precisely the relative deviation of said not conforming teeth at the update time with respect to the active intermediate model before deformation.

In one preferred embodiment, the movement of the tooth models is continued until the positioning error for each tooth model, with regard to the deformation update image, is less than 1 mm, preferably less than $5/10$ mm, preferably less than $3/10$ mm, preferably less than $2/10$ mm, and preferably less than $1/10$ mm.

Constraint

Preferably, virtual acquisition conditions are sought that correspond to the actual acquisition conditions of the deformation update image and that allow the active intermediate model to be observed so that the view of said model is as close as possible to the deformation update image. This search may have been performed in step 3) if the deformation update image is the analysis update image.

In one embodiment, these virtual acquisition conditions are determined taking into account all the tooth models. Not conforming teeth will therefore contribute negatively to the accuracy of said virtual acquisition conditions. However, these teeth are few in number and their impact is generally low.

Preferably, the virtual acquisition conditions are determined without taking into account the tooth models of the not conforming teeth, and in particular of the unseated teeth. It is thus possible to determine "constrained" virtual acquisition conditions that accurately correspond to the actual acquisition conditions of the deformation update image and that allow the active intermediate model to be observed so that the view of said model, called the "constrained view", is very close to the deformation update image. The obtained constrained view is in particular very accurate with respect to the conforming teeth since it is not degraded by the effect of the not conforming teeth.

In particular in the latter embodiment, the representations of the conforming teeth, in the deformation update image, may advantageously serve as references the position of which in the active intermediate model is known. Specifically, in the view obtained under said virtual acquisition conditions, these references have relative positions that are identical to the relative positions they have in the deformation update image.

Preferably, at least three non-aligned points are used as references—for example the cusps of conforming teeth, and in particular of teeth that have not unseated. Analyzing the distances between the representations of these references in the deformation update image then makes it possible, via simple computation, to evaluate said virtual acquisition conditions.

Advantageously, said virtual acquisition conditions may then be used to test all the positions of the tooth models of the not conforming teeth, and in particular of the unseated teeth.

Movement of the Tooth Models of the not Conforming Teeth Via Optimization

The active intermediate model is preferably deformed by means of an optimization algorithm.

Preferably, an iterative process is implemented whereby, in each iteration, one or more tooth models of not conforming teeth, and in particular of unseated teeth, are moved, then the degree of compatibility between the active intermediate model thus modified and the deformation update image is evaluated, the iterations being continued until a compatibility between the modified model and the deformation update image is found.

The number of iterations may be, for example, greater than 10, greater than 100, greater than 1000, greater than 10 000 and/or less than 1 000 000.

The following steps are preferably implemented:
A) analyzing the deformation update image and producing an updated map relating to discriminating information;
B) searching, on the basis of the updated map and via movement of tooth models of not conforming teeth, and in particular of unseated teeth, for an updated model corresponding to the positions that the teeth had when the deformation update image was acquired, the search preferably being carried out by means of a, preferably evolutionary, metaheuristic method, and preferably by simulated annealing.

Following step A), the deformation update image is analyzed so as to produce an updated map relating to at least one form of discriminating information.

"Discriminating information" is characteristic information that may be extracted from an image (i.e. an image feature), conventionally by computer processing of this image.

Discriminating information may have a variable number of values. For example, contour information may be equal to 1 or 0 depending on whether or not a pixel belongs to a contour. Gloss information may take a high number of values. Image processing allows discriminating information to be extracted and quantified.

The updated map represents discriminating information in the frame of reference of the deformation update image. The discriminating information is preferably chosen from the group consisting of contour information, color information, density information, distance information, gloss information, saturation information, information on reflections and combinations of these forms of information. The discriminating information is preferably contour information.

The objective of step B) is to modify the active intermediate model until an updated model that corresponds to the deformation update image is obtained. Ideally, the updated model is therefore a three-dimensional digital arch model on the basis of which the deformation update image could have been taken, if this model were real, and neglecting the aligner if it is represented in the deformation update image.

Various models are therefore tested successively, the selection of a model to be tested preferably depending on the level of correspondence of the previously tested models with the deformation update image. This selection is preferably made using a known optimization method, in particular one selected from, preferably evolutionary, metaheuristic optimization methods, and in particular from simulated annealing methods.

Preferably, the metaheuristic optimization method is selected from the group formed by
evolutionary algorithms, preferably chosen from:
evolution strategies, genetic algorithms, differential-evolution algorithms, estimation of distribution algorithms, artificial immune systems, path relinking, shuffled complex evolution, simulated annealing, ant-colony-optimization algorithms, particle-swarm-optimization algorithms, taboo search, and the GRASP method;
the kangaroo algorithm,
the Fletcher-Powell method,
the noising method,
stochastic tunneling,
random-restart hill climbing,
the cross-entropy method, and
hybrid methods combining the aforementioned metaheuristic methods.

Preferably, step B) comprises the following steps:
B1) defining a model to be tested via movement, in the active intermediate model, of tooth models of not conforming teeth, and in particular of unseated teeth;
B3) producing a view of the model to be tested under said constrained virtual acquisition conditions;
B4) processing the view to produce at least one test map representing, at least partially, said discriminating information;
B5) testing the model to be tested, by comparing the updated map and said test map, so as to measure the difference between the updated map and said test map, this difference also being called the "degree of compatibility" or "degree of concordance";
B6) depending on said difference, for example if the difference is less than a threshold,
modifying the model to be tested by moving one or more tooth models of not conforming teeth, and in particular of unseated teeth, then returning to step B3); or
defining the updated model to be the tested model the test map of which differs the least from the updated map.

The measurement of said difference depends on the discriminating information used. Said difference may be for example measured via the ratio of the number of points that belong both to a contour of the test map and to a contour of the updated map, over the total number of points of the contour of the updated map, or be measured via the product of the inverse of the average distance between the contours represented in said updated and test maps, and the length of the contour represented in the updated map.

The updated model obtained at the end of step B) is thus a model that results from successive modifications of the active intermediate model, and that is very accurate, as it results from a deformation of the initial model. Advantageously, the updated model is therefore very accurate, even though it was obtained on the basis of simple photographs or film images taken without particular precautions.

Tooth models cannot interpenetrate. The movement of the tooth models of the unseated teeth, in particular in step 5), is therefore limited by the tooth models of the non-unseated teeth, which remain stationary. The search for the updated model is further accelerated thereby.

Moving the tooth models of the active intermediate model allows an updated model to be obtained that may be observed under conditions under which the view of the updated model is compatible with the deformation update image. In other words, this view may be superposed in register with the deformation update image so that the teeth represented in the view and in the deformation update image superpose substantially exactly.

The update of the active intermediate model may be refined by repeating the previous operations with a plurality of update images as analysis and/or deformation update images. It leads to an updated model that represents the teeth substantially in their actual configuration at the update time.

Alternatively or in addition to the use of optimization methods, the search for the updated model makes recourse to a deep-learning device, and preferably to a neural network.

Movement of the Tooth Models of the not Conforming Teeth Depending on an Evaluation of Non-Conformity In one embodiment, the analysis of the analysis update image allows non-conformity to be quantified by a "degree of non-conformity".

In particular, in one embodiment, the analysis of the analysis update image allows unseating, and preferably the variation in unseating along the edge of an unseated tooth, to be measured.

Preferably, this information on non-conformity is used to move the tooth models of the not conforming teeth, and in particular of the unseated teeth, in step 5). For example, in FIG. 12, the measurement of d may be used to move the tooth D1 downward, for example via a translation $d-d_{min}$.

It is particularly useful for the movement of the tooth models depending on the nature and amplitude of the non-conformities evaluated on the basis of the analysis update image to be an initial operation of step 5). Preferably, this operation of coarse movement is followed by an operation of fine movement, preferably via optimization or with a deep-learning device, preferably a neural network.

In step 6), at least one updated aligner suitable for modifying the arch from its actual configuration at the update time toward the final configuration is designed. By "toward said final configuration", what is meant is that the updated aligner is shaped to modify the configuration of the arch to bring it closer to the final configuration. A plurality of new aligners may however be required to reach the final configuration.

Preferably, a new series of aligners is designed taking into account the updated model rather than the initial model. Preferably, steps a) to d) described above are used to do this, the initial time and the initial model being replaced by the update time and the updated model, respectively.

In step 7), at least the one or more first aligners of the new series of aligners are manufactured, preferably as in step e).

The aligners may for example be manufactured according to the teaching of EP1835864.

These new aligners are given to the patient, for example being sent by post.

The patient then continues the treatment with these new aligners.

System

The methods according to the invention are at least partially, and preferably entirely, computer-implemented. Any computer may be envisioned, in particular a PC, a server, or a tablet.

Conventionally, a computer in particular comprises: a processor, a memory; a human-machine interface, conventionally comprising a keyboard, a screen and a mouse; a module for communication via the Internet, via WiFi, via Bluetooth® or via the telephone network; and communication buses. The memory conventionally comprises ROM and RAM memories. A software package configured to implement some of a method of the invention in question is loaded into the memory of the computer.

The computer may also be connected to a printer, to a scanner, to a CD-ROM drive, to a DVD drive, to a hard disk drive, to a disk burner or to a loudspeaker.

The communication buses are the devices that ensure wired or remote communication between the other elements of the computer.

A computer may be used, automatically or with the assistance of an operator:
  in step a), to display and manipulate the initial model, and in particular to modify the point of observation of the initial model;
  in step a), to cut the initial model;
  to determine the final model;
  to determine and/or to display potential scenarios for a given treatment;
  to display and/or determine the treatment scenario, and therefore to determine and store the intermediate models;
  in step 2), to determine the active intermediate model;
  in step 3), to analyze the analysis update image to detect the representations of not conforming teeth, and in particular of unseated teeth;
  in step 4), to identify the tooth models of not conforming teeth, and in particular of unseated teeth, in the active intermediate model;
  in step 5), to move the tooth models of the active intermediate model;
  in optional steps 6) and d), to design the aligners.

The operator may in particular be a dental professional, preferably an orthodontist. The computer may implement one or more deep-learning devices, preferably neural networks.

FIG. 6 shows a system in one preferred embodiment of the invention.

This system comprises a plurality of mobile phones, for example more than 1000, and preferably more than 10 000, mobile phones 21 belonging to patients P and each communicating with a centralized computer 50.

Preferably, the centralized computer 50 is configured to receive and process update images, and in particular aligner images Ig and images Id of bare teeth, of a plurality of patients, and preferably more than 100, more than 1000, or more than 10 000 patients. The centralized computer 50 may be configured to receive and process update images of patients who are all under the care of the same orthodontist. Preferably, the centralized computer 50 is configured to receive and process update images of patients who are under the care of a plurality of different orthodontists, for example more than 10, more than 100 or more than 1000 orthodontists.

The centralized computer 50 comprises a communication module for communicating, for example via WiFi, via Bluetooth®, via optical fiber or via the telephone network, with a plurality of local computers 52, for example more than 10 or more than 100 local computers, which are preferably located in orthodontic practices.

The system also comprises a plurality of scanners 54, in communication with one or more local computers, preferably each with a single local computer, for example via a wired link, via WiFi, via Bluetooth®, via optical fiber or via the telephone network. Preferably, each scanner 54 is in the same place as a respective local computer, and preferably in the same orthodontic practice.

The system also comprises a manufacturing unit provided with a manufacturing computer 56 in communication with the centralized computer and/or with the local computers, for example via a wired link, via WiFi, via Bluetooth®, via optical fiber or via the telephone network.

Example

In step a), the initial model $M_0$ is generated, at the initial time, with a scanner 54. It is then transmitted to the local computer 52. A software package, loaded into the local computer, preferably allows the initial model to be cut automatically to create the tooth models.

After having examined the patient, the orthodontist defines a final model $M_f$, by moving the tooth models by means of the local computer.

Preferably, the local computer 52 is programmed to, in steps b) and c), determine one or more scenarios of modification of the arch so that it reaches the final configuration corresponding to the final model. Preferably, the local computer also allows the orthodontist to view the potential scenarios and to select a treatment scenario. Preferably, the orthodontist is also able to create or modify a scenario proposed by the local computer 52.

The intermediate times and the corresponding intermediate models may be defined by the local computer or proposed by the local computer 52 to the orthodontist so that he may validate and/or modify them.

The local computer 52 transmits the treatment scenario, and in particular at least the intermediate models $M_i$ and the initial and final models $M_0$, $M_f$, to the central computer 50.

In step d), a software package, loaded into the centralized computer 50, determines, on the basis of these models, the shape of the aligners to be manufactured, then transmits this information $I_0$ to the manufacturing unit with a view to manufacturing, in step e), the aligners $G_0$.

Alternatively, the initial, intermediate and final models may be transmitted, by the centralized computer 50, to the manufacturing computer 56, which determines, in step d), the shape of the N aligners and controls manufacture.

Alternatively again, step d) may be executed by the local computer 52. The local computer then transmits the information required to manufacture the aligners to the manufacturing unit.

The aligners $G_0$ are sent to the patient, who begins his treatment.

Preferably, the patient receives reminders that ask him to take one or more update images, and preferably at least one aligner image and, preferably, one or more images of bare teeth.

In step 1), at an update time, the patient takes photos, with and without the active aligner that he is required to wear at the time. The patient uses his mobile phone 21 to this end and transfers these photos to the centralized computer 50.

In step 2), the centralized computer identifies the active intermediate model, depending on the update time of acquisition of the photos. Preferably, it identifies, as active intermediate model, the intermediate model the intermediate time of which is closest to the update time. More preferably, it identifies, as active intermediate model, the intermediate model that was used to design the active aligner worn by the patient at the update time.

In step 3), the centralized computer 50 analyzes the photos, and in particular the photos representing the aligner in service position, with a view to automatically detecting non-conformities, and in particular unseating of teeth, and to identifying not conforming teeth, and in particular unseated teeth. If no not conforming teeth, and in particular unseated teeth, are detected, it transmits a message to the patient and/or to the orthodontist to inform him that the treatment is progressing normally.

Preferably, the centralized computer 50 is programmed these teeth.

Otherwise, in step 4), the centralized computer 50 identifies, possibly with the assistance of an operator, the tooth models of the not conforming teeth, and in particular of the unseated teeth.

In step 5), the centralized computer modifies the active intermediate model by moving the tooth models of the not conforming teeth, and in particular of the unseated teeth, until an updated model $M_a$ that is compatible with the photos taken at the update time is found.

In step 6), the centralized computer designs one or more new aligners $G_1$ to take into account the updated model, then transmits the information required to manufacture them to the manufacturing computer 56 of the manufacturing unit.

In step 7), the manufacturing unit manufactures the new aligners $G_1$. The new aligners are then transmitted to the patient so that he may continue his treatment with these new aligners.

Variants

In one embodiment, a method according to the invention uses an aligner image to update a determined active intermediate model, at an initial time, to represent the arch in an anticipated configuration at an intermediate time $t_i$ marking a change of aligner. The intermediate models of the treatment scenario therefore represent the arch configurations expected at respective intermediate times $t_n$, at which the patient will be asked to change aligner. The patient will therefore begin to wear the first aligner of the series of aligners at the start of the treatment, i.e. substantially at the initial time $t_1$ at which the initial model was generated, then will change aligner at the intermediate times $t_2$, $t_3$, etc. The intermediate time $t_i$ is therefore the time at which the patient is expected to replace the $(i-1)^{th}$ orthodontic aligner of the series with the $i^{th}$ orthodontic aligner of the series, i being greater than or equal to 2. If the treatment is planned with 30 aligners for example (N=30), he will therefore start to wear the $30^{th}$ aligner at the time $t_{30}$, and will wear it until the final time $t_{31}$.

The number N of aligners may be greater than 5, greater than 10, greater than 20, or greater than 30 and/or less than 60, and preferably less than 50.

The time interval between two successive changes of aligners, i.e. between two successive intermediate times, may be greater than 7 days, or greater than 15 days and/or less than 60 days, and preferably less than 30 days.

In one embodiment, the treatment scenario is not limited to a series of intermediate models for changes of aligners, but includes other intermediate models the intermediate time of which does not mark a change of aligner. Preferably, the treatment scenario is a substantially continuous series of intermediate models. The treatment scenario is therefore similar to a film allowing progress from the initial model to the final model to be viewed.

Advantageously, the suitability of an active aligner may therefore advantageously be checked at any time. The update images may be acquired at any update time during the treatment. Depending on the treatment scenario, an active intermediate model that corresponds to the update time, i.e. that represents the arch in a configuration that is expected, according to the treatment scenario, for the update time, is then selected.

In one embodiment, an additional intermediate model may be generated from intermediate models of the treatment scenario, and added to the treatment scenario. In particular, if the update time is between two intermediate times $t_i$ and $t_{i+1}$, an additional intermediate model may be created, for example by interpolation, from the intermediate models of the intermediate times $t_i$ and $t_{i+1}$, to serve as an active intermediate model. An additional intermediate model may in particular be generated during the treatment.

As should now be clear, a method according to the invention makes it possible, on the basis of simple photos or a simple film, to obtain a very precise updated model, corresponding to the actual configuration of the arch at the update time, but without having to perform a new scan. The method may thus be implemented without having to make an appointment with the orthodontist.

Of course, the invention is not limited to the embodiments described above and shown.

An orthodontic treatment may be therapeutic and/or esthetic.

A plurality of update images may be used in step 3) and/or in step 5).

The positioning error of a tooth model may be used to detect a drift in the orthodontic treatment, i.e. to detect a situation in which the progress of the position of the teeth is not following the treatment scenario.

Lastly, the patient is not necessarily a human being. In particular, a method according to the invention may be used for another animal.

The invention claimed is:

1. A non-transitory computer medium storing computer-program instructions for executing a method, performed by computer, for generating an updated three-dimensional digital model of a dental arch of a patient, during a treatment with orthodontic aligners of said dental arch, the treatment implementing a treatment plan generated before the start of the treatment, a treatment plan comprising a sequence of models, representing successive expected intermediate and final configurations of the dental arch at intermediate times during the treatment and at the end at the treatment, the generating method comprising the following steps:
   1) before step 3), determining an active intermediate model from intermediate models of the treatment plan;
   2) searching, in at least one of updated images for one or more representations of teeth that is not inconformity with the treatment plan, wherein the non-conformity being measured by comparing said at least one of the update images with a view of the active intermediate model, and the at least one of the update images being acquired during the treatment, each of the update images being an aligner image representing an active aligner attached to the dental arch, or an image of bare teeth representing the dental arch without aligner;
   3) for each not conforming tooth detected, identifying in the active intermediate model a not conforming tooth model representing the not conforming tooth detected during the searching;
   4) deforming the active intermediate model by moving each of not conforming tooth models until an updated model compatible with the at least one of the update images is obtained, wherein the deformation depending on the measurement of the non-conformity performed at step 2).

2. The non-transitory computer program as claimed in claim 1, wherein, in step 3), to detect a not conforming tooth, a position, orientation and calibration of a virtual acquiring device are sought, the position, orientation and calibration allowing said virtual acquiring device to have a view on the active intermediate model that is as close as possible to the update image; then
said view and said update image are compared, or an updated map representing discriminating information of said update image is compared with a reference map representing said discriminating information in said view; or when
the update image is an aligner image, a contour of at least one tooth and a contour of the active aligner are determined in the update image, then said contours are compared.

3. The non-transitory computer program as claimed in claim 1, wherein, during said deformation of the active intermediate model in step 4), the only tooth models moved are tooth models of not conforming teeth.

4. The non-transitory computer program as claimed in claim 3, wherein, in step 4), the movement of the tooth models of the not conforming teeth is an iterative process whereby, in each iteration, one or more of said tooth models are moved so as to obtain an arch model to be tested, then the arch model to be tested is tested by evaluating a degree of compatibility between said model and the update image, the updated model being, among all the tested models, the one which provides the highest degree of compatibility.

5. The non-transitory computer program as claimed in claim 4, wherein, before said iterative process, constrained virtual acquisition conditions of a virtual acquiring device are sought, said constrained virtual acquisition conditions comprising a position, orientation and calibration of a virtual acquiring device allowing the active intermediate model to be observed such as to generate a view in which the representation of the conforming teeth is superposable in register with the representation of said conforming teeth in the deformation update image, then during said iterative process, in each iteration, the degree of compatibility between the arch model under test and the update image is evaluated by comparing the update image and a view of the arch model under test under said constrained virtual acquisition conditions.

6. The non-transitory computer program as claimed in claim 1, wherein, the update images are photos or images extracted from a film and are acquired with a mobile phone.

7. The non-transitory computer program as claimed in claim 1, wherein, before step 4), the active intermediate model is processed in order to improve its precision.

8. The non-transitory computer program as claimed in claim 1, wherein, in step 4), the deformation of the active intermediate model comprises movements of tooth models of said active intermediate model, and wherein said movements are continued until the positioning error for each tooth model, in light of the update image, is less than 1 mm, preferably less than 5/10 mm, preferably less than 3/10 mm, preferably less than 2/10 mm, and preferably less than 1/10 mm.

9. The non-transitory computer program as claimed in claim 1, wherein, in step 2), the update image is an image of bare teeth.

10. The non-transitory computer program as claimed in claim 1, wherein the active intermediate model is chosen so that the intermediate time of the active intermediate model differs by less than two weeks from the time of acquisition of the update image.

11. The non-transitory computer program as claimed in claim 1, wherein intermediate models of the treatment plan represent the dental arch in expected configurations at intermediate times marking a change of aligner.

12. The non-transitory computer program as claimed in claim 1, wherein the treatment plan is a continuous series of intermediate models, the treatment plan being similar to a film allowing progress from an initial model to a final model to be viewed.

13. The non-transitory computer program as claimed in claim 1, wherein, before step 1), an intermediate model of the dental arch is generated from intermediate models of the treatment plan, then added to the treatment plan to serve as the active intermediate model.

14. The non-transitory computer program as claimed in claim 1, wherein, in step 2), the representation of a tooth in the update image does not conform with the treatment plan if, when the update image is superposed in register on a view of the active intermediate model that is compatible with said update image, the update image being at the same scale as the view of the active intermediate model and at real-scale, at least one point of said representation is separated from the corresponding point in said view by a distance greater than $\frac{1}{10}$ mm and less than 7 mm.

15. A non-transitory computer medium storing computer-program instructions for executing a method for manufacturing an orthodontic aligner, said method comprising a method for generating an updated model as claimed in claim 1, then the following steps:
   5) designing, on the basis of the updated model and of a final model representing the arch in a theoretical final configuration, an "updated" aligner suitable for modifying the dental arch from an actual configuration at the time the image is acquired toward said theoretical final configuration;
   6) transmitting an information required to manufacture the updated aligner to a manufacturing unit.

* * * * *